US008743122B2

(12) United States Patent
Riche et al.

(10) Patent No.: US 8,743,122 B2
(45) Date of Patent: Jun. 3, 2014

(54) INTERACTIVE VISUALIZATION FOR EXPLORING MULTI-MODAL, MULTI-RELATIONAL, AND MULTIVARIATE GRAPH DATA

(75) Inventors: Nathalie Riche, Seattle, WA (US); Bongshin Lee, Issaquah, WA (US); Cody G. Dunne, Lanham, MD (US)

(73) Assignee: Microsoft Corporation, Redmond, WA (US)

( * ) Notice: Subject to any disclaimer, the term of this patent is extended or adjusted under 35 U.S.C. 154(b) by 311 days.

(21) Appl. No.: 13/041,474

(22) Filed: Mar. 7, 2011

(65) Prior Publication Data

US 2012/0229466 A1 Sep. 13, 2012

(51) Int. Cl.
*G06T 11/20* (2006.01)

(52) U.S. Cl.
USPC .......................................................... 345/440

(58) Field of Classification Search
None
See application file for complete search history.

(56) References Cited

U.S. PATENT DOCUMENTS

| 5,999,192 | A  | * | 12/1999 | Selfridge et al. ............... | 345/440 |
| 6,995,768 | B2 | * | 2/2006  | Jou et al. ........................ | 345/440 |
| 2008/0104225 | A1 | | 5/2008 | Zhang et al. | |
| 2010/0042944 | A1 | | 2/2010 | Robinson et al. | |
| 2010/0106752 | A1 | | 4/2010 | Eckardt et al. | |

OTHER PUBLICATIONS

Heer, Prefuse: A Toolkit for Interactive Information Visualization, Conference on Human Factors in Computing Systems, Apr. 2005, 10 Pages.*
Jusufi, The Network Lens: Interactive Exploration of Multivariate Networks Using Visual Filtering, 14th International Conference on Information Visualization, 2010, pp. 35-42.*
Peter, Balancing Systematic and Flexible Exploration of Social Networks, IEEE Transactions on Visualizations and Computer Graphics, vol. 12, No. 5, Sep./Oct. 2006, pp. 693-700.*
Singh, et al., "Visual Mining of Multi-Modal Social Networks at Different Abstraction Levels," retrieved at <<http://citeseerx.ist.psu.edu/viewdoc/download?doi=10.1.1.122.8117&rep=rep1&type=pdf>>, Proceedings of the 11th International Conference Information Visualization, Jul. 2007, 8 pages.
Henry, et al., "Matlink: Enhanced Matrix Visualization for Analyzing Social Networks," retrieved at <<http://citeseerx.ist.psu.edu/viewdoc/download?doi=10.1.1.76.1071&rep=rep1&type=pdf>>, Proceedings of the 11th IFIP TC 13 International Conference on Human-computer Interaction, vol. II, 2007, 14 pages.

(Continued)

*Primary Examiner* — Hau Nguyen
*Assistant Examiner* — Ryan M Gray
(74) *Attorney, Agent, or Firm* — Dan Choi; Carole Boelitz; Micky Minhas

(57) ABSTRACT

A graph exploration module is described which displays graph data (or any data set) using any one of an extensible collection of chart types. Some of the chart types may present aggregated results associated with the graph data. One chart type provides bars which represent aggregations of nodes in the graph data and a collection of links which represent relationships among the bars. The graph exploration module may present the chart in the context of an interactive exploration panel within an exploration canvas. A user can make various selections which prompt the graph exploration module to generate a new exploration panel, together with a link which connects to the new panel to the previous panel. This process can be repeated any number of times to produce one or more exploration paths which reveal a history of exploration actions made by the user(s). That history can be saved and later retrieved.

20 Claims, 19 Drawing Sheets

(56) References Cited

OTHER PUBLICATIONS

Elmqvist, et al., "ZAME: Interactive Large-Scale Graph Visualization," retrieved at <<http://citeseerx.ist.psu.edu/viewdoc/download?doi=10.1.1.134.9193&rep=rep1&type=pdf>>, IEEE Pacific Visualization Symposium, Mar. 2008, 8 pages.

Elmqvist, et al., "Hierarchical Aggregation for Information Visualization: Overview, Techniques and Design Guidelines," retrieved at <<http://www.purdue.edu/discoverypark/vaccine/publications/pdf/Hierarchical%20Aggregation %20for%20Information.pdf>>, IEEE Transactions on Visualization and Computer Graphics, vol. 16,No. 3, May 2010, 14 pages.

Jusufi, et al., "The Network Lens: Interactive Exploration of Multivariate Networks Using Visual Filtering," retrieved at <<http://w3.msi.vxu.se/~kerren/pubs/kerren-iv10.pdf>>, 14th International Conference Information Visualisation, 2010, pp. 35-42.

Abello, et al., "ASK-GraphView: A Large Scale Graph Visualization System," retrieved at <<http://citeseerx.ist.psu.edu/viewdoc/download?doi=10.1.1.141.342&rep=rep1&type=pdf>>, IEEE Transactions on Visualization and Computer Graphics, vol. 12, No. 5, Sep./Oct. 2006, 8 pages.

Adar, Eytan, "GUESS: A Language and Interface for Graph Exploration," retrieved at <<http://citeseerx.ist.psu.edu/viewdoc/download?doi=10.1.1.98.5332&rep=rep1&type=pdf>>, Conference on Human Factors in Computing Systems, Apr. 2006, 10 pages.

Batagelj, et al., "Pajek—Program for Large Network Analysis," retrieved at <<http://www.educa.fmf.uni-lj.si/datana/pub/networks/doc/pajek.pdf>>, 1997-1999, 11 pages.

Bezerianos, et al., "GraphDice: a System for Exploring Multivariate Social Networks," retrieved at <<http://www.aviz.fr/graphdice/graphdice.pdf>>, Eurographics, vol. 29, No. 3, 2010, 10 pages.

Blaas, et al., "Smooth Graphs for Visual Exploration of Higher-order State Transitions," retrieved at <<http://www.wigis.net/resources/VisWeek2009/infovis/papers/blaas.pdf>>, IEEE Transactions on Visualization and Computer Graphics, vol. 15, No. 6, Nov./Dec. 2009, pp. 969-976.

Fekete, Jean-Daniel, "The InfoVis Toolkit", retrieved at <<http://citeseerx.ist.psu.edu/viewdoc/download? doi=10.1.1.1.1537&rep=rep1&type=pdf>>, Proceedings of the IEEE Symposium on Information Visualization, 2004,15 pages.

Fekete, et al., "Overlaying Graph Links on Treemaps," retrieved at <<http://hcil.cs.umd.edu/trs/2003-32/2003-32.pdf>>, IEEE Infovis poster, 2003, 2 pages.

Freire, et al., "ManyNets: an Interface for Multiple Network Analysis and Visualization," retrieved at <<http://citeseerx.ist.psu.edu/viewdoc/download?doi=10.1.1.148.3732&rep=rep1&type=pdf>>, Conference on Human Factors in Computing Systems, Apr. 2010, 10 pages.

Heer, et al., "Prefuse: A Toolkit for Interactive Information Visualization," retrieved at <<http://citeseerx.ist.psu.edu/ viewdoc/download?doi=10.1.1.80.3032&rep=rep1&type=pdf>>, Conference on Human Factors in Computing Systems, Apr. 2005, 10 pages.

Heer, et al., "Graphical Histories for Visualization: Supporting Analysis, Communication, and Evaluation," retrieved at <<http://kneecap.cs.berkeley.edu/papers/graphical_histories/2008-GraphicalHistories-InfoVis.pdf>>, IEEE Transactions on Visualization and Computer Graphics, vol. 14, No. 6, Nov. 2008, 8 pages.

Henry, et al., "MatrixExplorer: a Dual-representation System to Explore Social Networks," retrieved at <<http://citeseerx.ist.psu.edu/viewdoc/download?doi=10.1.1.104.1055&rep=rep1&type=pdf>>, IEEE Transactions on Visualization and Computer Graphics, vol. 12, No. 5, Sep./Oct. 2006, 8 pages.

Henry, et al., "NodeTrix: a Hybrid Visualization of Social Networks," retrieved at <<http://citeseerx.ist.psu.edu/viewdoc/download?doi=10.1.1.81.4929&rep=rep1&type=pdf>>, IEEE Transactions on Visualization and Computer Graphics, vol. 13, No. 6, Nov. 2007, 8 pages.

Hurter, et al., "FromDaDy: Spreading Aircraft Trajectories Across Views to Support Iterative Queries," retrieved at <<http://www.wigis.net/resources/VisWeek2009/infovis/papers/hurter.pdf>>, IEEE Transactions on Visualization and Computer Graphics, vol. 15, No. 6, Nov./Dec. 2009, pp. 1017-1024.

Kang, et al., "NetLens: Iterative Exploration of Content-actor Network Data," retrieved at <<http://delos.zoo.ox.ac.uk/pub/2008/citationnetworkdev/NetworkVisualizationPapers/Bederson%20NetLens.pdf>>, Information Visualization, vol. 6, No. 1, Mar. 2007, pp. 18-31.

Lee, et al., "Understanding Research Trends in Conferences Using Paper Lens," retrieved at <<http://citeseerx.ist.psu.edu/viewdoc/download?doi=10.1.1.77.4648&rep=rep1&type=pdf>>, Conference on Human Factors in Computing Systems, Apr. 2005, 10 pages.

Lee, et al., "FacetLens: Exposing Trends and Relationships to Support Sensemaking within Faceted Datasets," retrieved at <<http://citeseerx.ist.psu.edu/viewdoc/download?doi=10.1.1.150.352&rep=rep1&type=pdf>>, Conference on Human Factors in Computing Systems, Apr. 2009, 10 pages.

Perer, et al., "Balancing Systematic and Flexible Exploration of Social Networks," retrieved at <<http://citeseerx.ist.psu.edu/viewdoc/download?doi=10.1.1.129.7998&rep=rep1&type=pdf>>, IEEE Transactions on Visualization and Computer Graphics, vol. 12, No. 5, Sep./Oct. 2006, pp. 693-700.

Plaisant, et al., "Promoting Insight-based Evaluation of Visualizations: From Contest to Benchmark Repository," retrieved at <<http://citeseerx.ist.psu.edu/viewdoc/download?doi=10.1.1.66.1118&rep=rep1&type=pdf>>, IEEE Transactions on Visualization and Computer Graphics, 2007, 18 pages.

Robertson, et al., "Data Mountain: Using Spatial Memory for Document Management," retrieved at <<http://citeseerx.ist.psu.edu/viewdoc/download?doi=10.1.1.33.283&rep=rep1&type=pdf>>, Eleventh Annual Symposium on User Interface Software and Technology, Nov. 1998, pp. 153-162.

Roth, et al., "Visage: a User Interface Environment for Exploring Information," retrieved at <<http://www-2.cs.cmu.edu/Groups/sage/PDF/Visage.pdf>>, Proc. Information Visualization, IEEE, 1996, 8 pages.

Saraiya, et al., "An Evaluation of Microarray Visualization Tools for Biological Insight," retrieved at <<http://citeseerx.ist.psu.edu/viewdoc/download?doi=10.1.1.132.9310&rep=rep1&type=pdf>>, IEEE Symposium on Information Visualization, Oct. 2004, 8 pages.

Shneiderman, et al., "Network Visualization by Semantic Substrates," retrieved at <<http://citeseerx.ist.psu.edu/viewdoc/download?doi=10.1.1.80.2917&rep=rep1&type=pdf>>, IEEE Transactions on Visualization and Computer Graphics, vol. 12, No. 5, Sep./Oct. 2006, 8 pages.

Shrinivasan, Yedendra Babu, "Supporting the Sensemaking Process in Visual Analytics," retrieved at <<http://www.win.tue.nl/~yedendra/dissertation.pdf>>, PhD thesis, Technische Universiteit Eindhoven, Jun. 2010, 160 pages.

Shrinivasan, et al., "Supporting the Analytical Reasoning Process in Information Visualization," retrieved at <<http://www.win.tue.nl/~yedendra/imgs/chi1145-Yedendra-shrinivasan.pdf>>, Conference on Human Factors in Computing Systems, Apr. 2008, 10 pages.

Wattenberg, Martin, "Visual Exploration of Multivariate Graphs," retrieved at <<http://citeseerxist.psu.edu/viewdoc/download?doi=10.1.1.93.9993&rep=rep1&type=pdf>>, Conference on Human Factors in Computing Systems, Apr. 2006, 9 pages.

Zhao, et al., "Elastic Hierarchies: Combining Treemaps and Node-link Diagrams," retrieved at <<http://citeseerx.ist.psu.edu/viewdoc/download?doi=10.1.1.61.5752&rep=rep1&type=pdf>>, Proceedings of the IEEE Symposium on Information Visualization, 2005, 8 pages.

\* cited by examiner

INTERACTIVE VISUALIZATION FOR EXPLORING MULTI-MODAL, MULTI-RELATIONAL, AND MULTIVARIATE GRAPH DATA

BACKGROUND

Many data sets can be represented in the form of a graph, namely, as a collection of nodes connected together by edges. In certain cases, the graph data is multi-modal, multi-relational, and/or multivariate. The graph data is multi-modal when it includes multiple different types of nodes. The graph data is multi-relational when the nodes can be connected together using multiple different types of edges. And the graph data is multivariate when each node (and/or each edge) can be characterized by multiple attributes.

A user may wish to provide a visual rendition of the graph data to gain a better understanding of general patterns, trends and other features in the graph data. Traditionally, the user has performed this task by representing the graph data as a collection of points (representing the nodes) that are connected together by lines (representing the edges). This approach may be effective for small graphs, but it quickly becomes unduly complex and confusing for larger data sets. Various techniques have been proposed to manage the complexity of such visual representations. Yet there is room for considerable improvement in this field.

SUMMARY

According to one implementation, a graph exploration module is described herein which generates and presents a chart that represents graph data (also referred to as network data) or any other data set. The chart has a type that is selected from among a plurality of available chart types. At least some of the chart types present aggregated results associated with the graph data, such as aggregated nodes and/or aggregated edges.

According to another illustrative aspect, the graph exploration module allows a user to freely switch between different chart types to visualize the graph data in different respective ways. In one case, the available chart types include any of: a bar chart type; a tag cloud type; a matrix type; a table type, and so on. Moreover, the collection of chart types is extensible, which accommodates the later introduction of new chart types.

According to another illustrative aspect, the bar chart provided by the graph exploration module may correspond to a hybrid-type bar chart. This type of bar chart may include a plurality of bars which represents respective aggregations of nodes in the graph data. Further, the bar chart may include a plurality of links which connect together respective pairs of bars, indicating relationships among those pairs of bars. More specifically, each link may represent an underlying aggregation of edges. At least one visual attribute of the link (such as the thickness of the link) may convey a size associated with the corresponding aggregation of edges.

According to another illustrative aspect, the graph exploration module may present the selected chart in the context of a first interactive exploration panel. Further, the graph exploration module can receive a panel-generation selection which prompts the graph exploration module to generate a second exploration panel.

According to another illustrative aspect, one type of panel-generation selection is a pivot-type selection. The pivot-type selection transitions from a first subgraph (for presentation in the first exploration panel) to a second subgraph (for presentation in the second exploration panel). The first subgraph has a first collection of nodes and the second subgraph has a second collection of nodes. The first collection of nodes is connected to the second collection of nodes along edges having a specified edge type. The second collection of nodes can have the same type or a different type compared to the first collection of nodes.

According to another illustrative aspect, another type of panel-generation selection is a filtering-type selection. Here, the user pulls out part (or parts) of the aggregated results that are presented in the first exploration panel. Upon the first extraction, this operation produces the second exploration panel. The second exploration panel includes a chart which focuses on a union of the extracted part(s) that have been pulled out of the first exploration panel.

According to another illustrative aspect, another type of panel-generation selection is a cloning-type selection. Here, the user invokes a command which produces the second exploration panel as a duplicate copy of the first exploration panel.

According to another illustrative aspect, the graph exploration module produces a visual link which represents the connection between the first exploration panel and the second exploration panel. The link may have at least one visual attribute which denotes a type of processing action that has been performed to produce the second exploration panel, e.g., a pivot-type action, a filtering-type action, or a cloning-type action.

According to another illustrative aspect, the graph exploration module can present one or more exploration paths that show a series of exploration actions taken by a user within an exploration session. That is, an exploration path includes at least two exploration panels, together with one or more links that connect the exploration panels together. The graph exploration module allows a user to identify a point within the exploration path. The point is associated with a state within the exploration path. In response, the graph exploration module selectively highlights those portions of the exploration path which contribute to the identified state.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative graph exploration module for presenting a visual rendition of graph data (or any other data set) using a series of exploration panels. Section B describes illustrative methods which explain the operation of the graph exploration module of Section A. Section C describes illustrative processing functionality that can be used to implement any aspect of the features described in Sections A and B.

Figure 22:
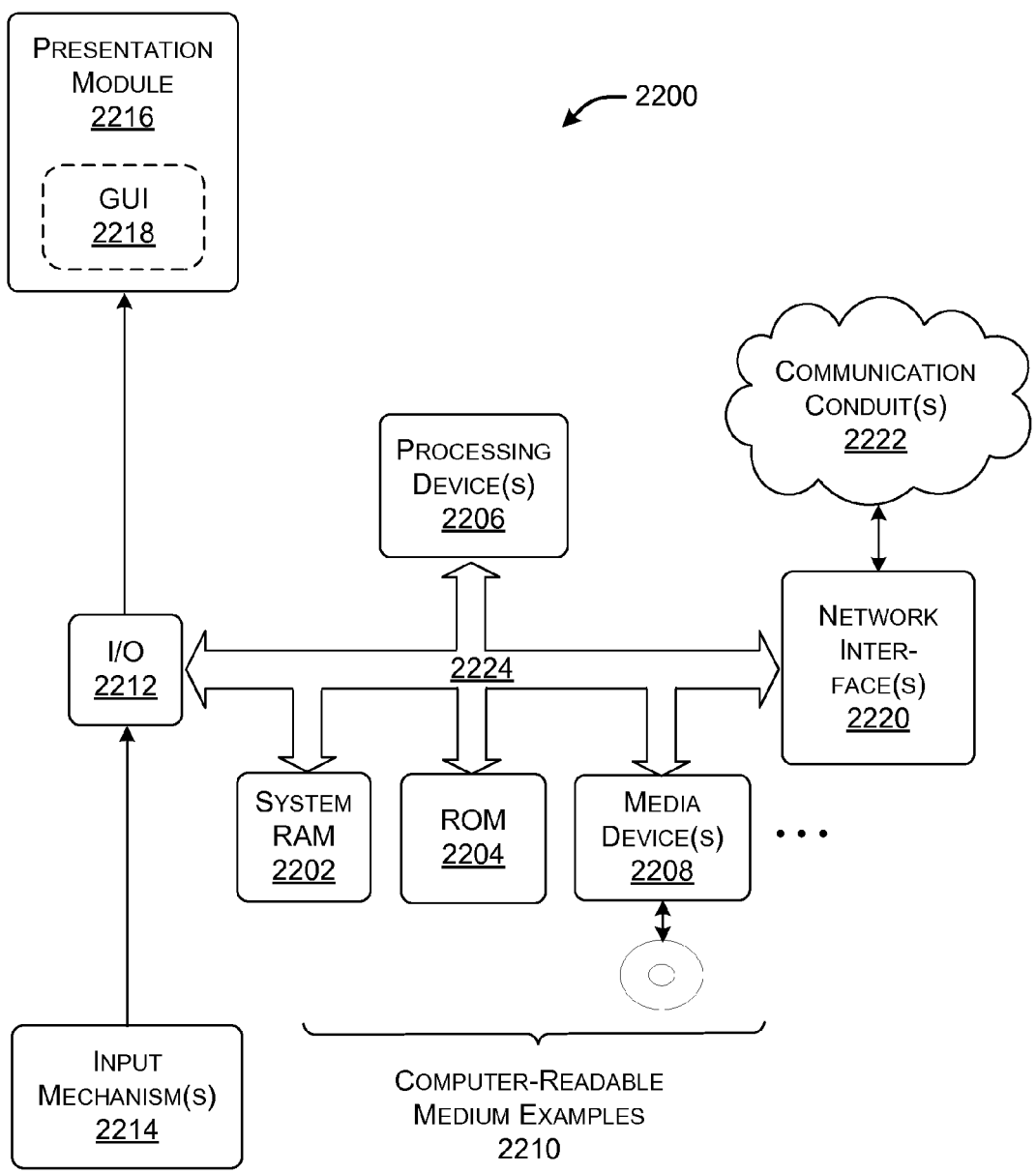
FIG. 22 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (for instance, by software, hardware, firmware, etc., and/or any combination thereof). In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 22, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from the order which is illustrated herein (including a parallel manner of performing the blocks). The blocks shown in the flowcharts can be implemented in any manner by any physical and tangible mechanisms (for instance, by software, hardware, firmware, etc., and/or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. An Illustrative Graph Exploration Module

A.1. Overview

Figure 1:
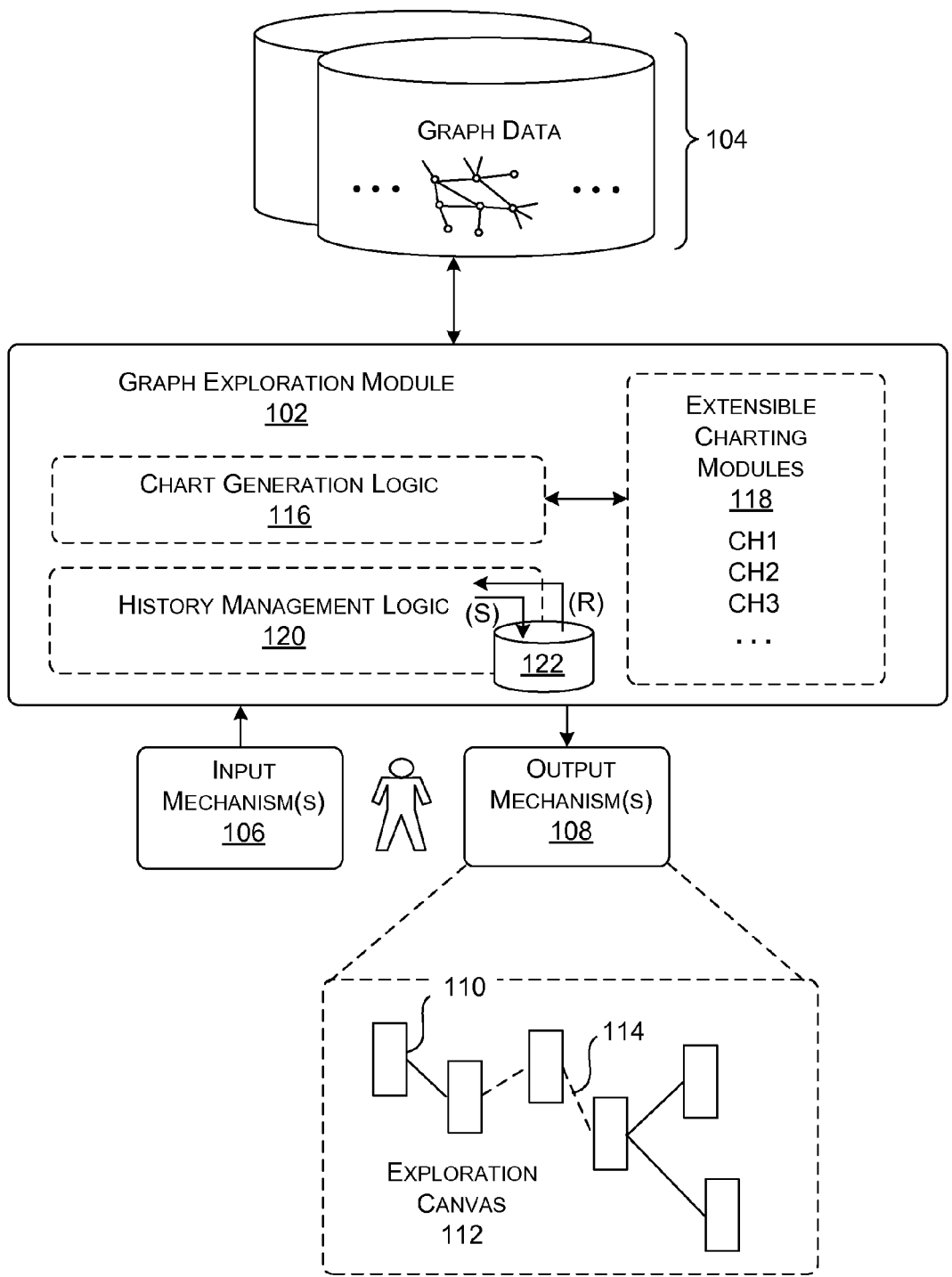
FIG. 1 shows an illustrative graph exploration module for providing a visual rendering of graph data or any other data set.

FIG. 1 shows a graph exploration module 102 for providing a visual representation of any data set. For example, a detailed example will be presented herein in which the data set represents graph data (also referred to network data). Graph data refers to data that can be represented as a graph, e.g., as a set of entities (corresponding to nodes) connected together via directed and/or undirected relationships (corresponding to edges). As noted above, the graph data may be multi-modal, multi-relational, and/or multivariate. The graph data is multi-modal when it includes multiple different types of nodes. The graph data is multi-relational when the nodes can be connected together using multiple different types of edges. And the graph data is multivariate when each node (and/or each edge) can be characterized by multiple attributes.

For example, this section will present a detailed example in which the graph data corresponds to a plurality of papers published by a source, such as the Association for Computing Machinery (ACM). The graph data in that scenario can be formulated as a plurality of nodes of different types. For example, the nodes may include a plurality of nodes associated with papers, a plurality of nodes associated with authors, and a plurality of nodes corresponding to proceedings. The graph data further includes a plurality of edges of different types which connect the nodes together. For example, the graph data may include a plurality of citation edges that connect papers that cite to other papers. And each node can be characterized by a plurality of attributes. For example, each paper node has a title, paper publication year, topic, etc., and each author node has an author name, affiliation, country, etc.

Other types of information that can be represented as a graph include information regarding a social network, a collection of web pages, a collection of code modules in a software system, scientific data of any nature (e.g., biologic networks, protein-protein interactions, metabolic pathways, etc.), an organization of concepts in any reference source (such as the Wikipedia reference source), and so on.

The graph exploration module 102 can obtain the graph data from any source or combination of sources. FIG. 1 generically indicates that the graph exploration module 102 obtains the graph data from one or more data stores 104. As will be described in connection with FIGS. 2 and 3 (below), the data stores 104 may be local and/or remote with respect to the location of the graph exploration module 102. Furthermore, the data stores 104 can be provided at a central location or can be distributed in any manner.

The graph exploration module 102 receives input from one or more input mechanisms 106, such as a keyboard, a mouse input device, a touch-sensitive screen or touch pad device, and so on, or any combination thereof. The graph exploration module 102 provides an output using one or more output mechanisms 108, such as a computer monitor of any type, a television screen, a screen of a handheld device, a printer device, and so on, or any combination thereof.

Broadly stated, the output of the graph exploration module 102 represents a visual rendering of the graph data. In one case, the graph exploration module 102 presents the graph data as a chart selected from among a plurality of available types of charts. As will be described below, the chart may formulate the graph data as a collection of aggregate results, e.g., representing aggregations of nodes and/or aggregations of edges. The graph exploration module 102 can form an aggregate result based on a size-by criterion, such as a count metric, an average metric, a minimum metric, a maximum metric, etc.

In one case, the graph exploration module 102 can represent the chart as a component within an exploration panel, such as exploration panel 110 (represented in high-level form in FIG. 1). An exploration panel corresponds to any graphical object that displays the graph data. In addition, the exploration panel provides various graphical interface features which allow a user to interact with the graph data.

For example, an exploration panel allows a user to enter various selections which produce different visualizations of the graph data within an exploration panel. For example, the user may enter a chart-type selection to change the type of chart that is used to visualize the graph data within an exploration panel. The user may also enter a presentation selection to change the manner in which the graph data is arranged within a chart, but without changing the type of the chart.

Figure 4:
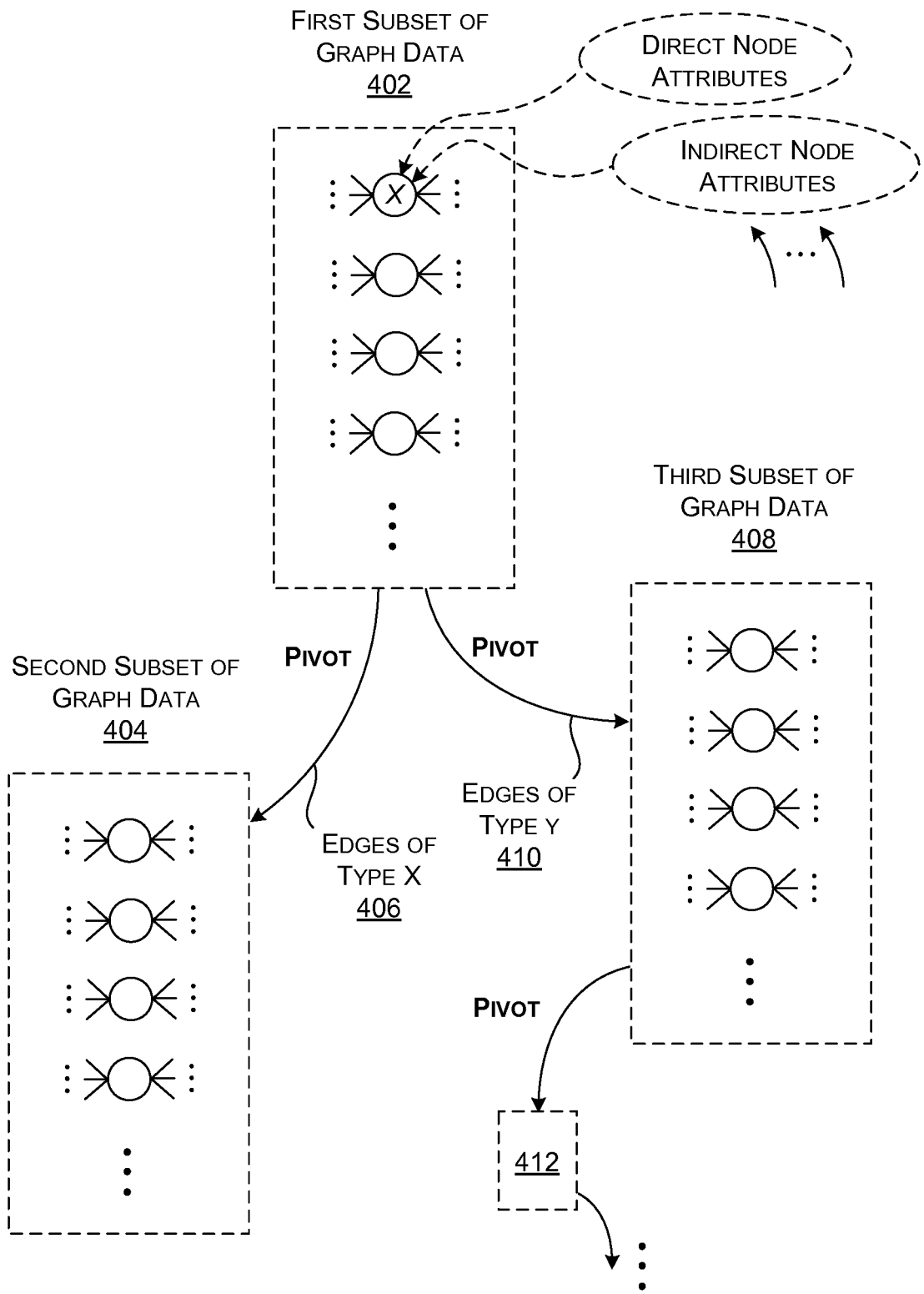
FIG. 4 shows one manner in which graph data can be structured, and how this graph data can be leveraged to perform pivoting between related subgraphs.

Further, the user may enter various kinds of panel-generation selections which prompt the graph exploration module 102 to generate a new chart within an entirely new exploration panel. For example, assume that the user is in the process of viewing a first exploration panel. Further assume that the first exploration panel presents a first chart that is formulated based on a first subgraph. The first subgraph includes a first collection of nodes selected from among an entire corpus of graph data. The user can enter a pivot-type selection to select a second subgraph comprising a second collection of nodes. The second collection of nodes is linked to the first collection of nodes via edges of particular type. In response, the graph exploration module 102 produces a second exploration panel. The second exploration panel includes a second chart that is formulated based on the second subgraph. FIG. 4 (described in turn below) provides additional information regarding the pivot-type selection.

In another case, the graph exploration module 102 allows a user to pull out one or more parts from the results presented in a first exploration panel (or plural exploration panels), e.g., using a drag-and-drop operation or the like. Upon the first extraction, this operation results in the generation of a second exploration panel. The second exploration panel includes a second chart which selectively focuses on the part(s) that have been pulled out of the first exploration panel. The selection which invokes this operation is referred to as a filtering-type selection herein.

In another case, the graph exploration module 102 allows a user to invoke a clone command. This results in the production of a second exploration panel which is a duplicate version (i.e., a clone) of the first exploration panel. The selection which invokes this cloning operation is referred to as a cloning-type selection herein.

The above-described three panel-generation scenarios are described by way of example, not limitation. Other implementations in other environments can use other triggering circumstances to generate a new exploration panel.

The graph exploration module 102 presents each exploration panel that it produces in a graphical exploration space referred to herein as an exploration canvas 112. Further, the graph exploration module 102 can provide links which connect the exploration panels together, thus forming a tree or other form of visual graph (such as a directed acyclic graph (DAG)). One such link is illustrative link 114. Each link connects a source exploration panel to a target exploration panel, indicating that the target exploration panel was produced, at least in part, from the source exploration panel. Further, each link can include at least one visual attribute which identifies the type of panel-generation action which was invoked to produce the target exploration panel, such as the above-described pivot-type operation, filtering-type operation, or cloning-type operation. In one implementation, the graph exploration module 102 may be configured to allow the user to manually select the locations of the exploration panels. For example, the graph exploration module 102 can allow a user to move an exploration panel using a drag-and-drop operation. In addition, the graph exploration module 102 can allow a user to adjust the size of any exploration panel.

Through the above-described provisions, the graph exploration module 102 can present one or more exploration paths which represent a history of the user's (or plural users') exploration actions within an exploration session. The graph exploration module 102 can also allow a user to identify a particular point in an exploration path, associated with a state within the exploration path. In response, the graph exploration module 102 highlights the pertinent portions of the exploration path which contributed to the identified state.

The graph exploration module 102 can be implemented by logic modules that perform the above-described functions. For example, the graph exploration module 102 includes chart generation logic 116 for generating the exploration panels. As stated, each exploration panel presents a visual rendering of the graph data in the form of a particular chart. To provide the chart, the chart generation logic 116 can rely on a collection of charting modules 118. Each charting module allows the chart generation logic 116 to generate a chart of a particular type. The collection of charting modules 118 is extensible. This means that a user or other agent may later add one or more new charting modules associated with respective new chart type(s).

The graph exploration module 102 also includes history management logic 120. The history management logic 120 stores information regarding exploration selections made by the user in an exploration session, together with the exploration panels and associated charts produced by the those selections. The history management logic 120 can store (S) any information associated with an exploration path in one or more data stores 122. The history management logic 120 can also retrieve (R) information associated with an exploration path. In some scenarios, multiple users can collaboratively generate such an exploration path over plural sessions.

Figure 2:
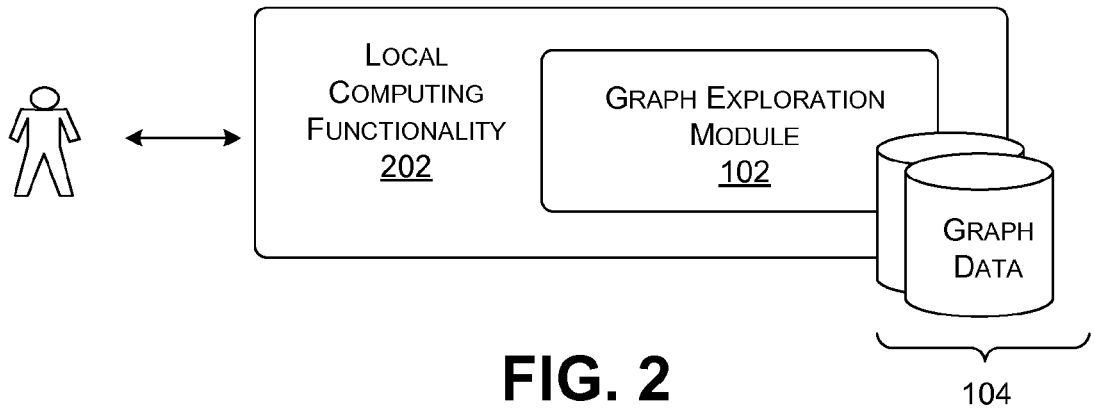
FIGS. 2 and 3 show two respective implementations of the graph exploration module of FIG. 1.

Advancing to FIG. 2, this figure shows one implementation of the graph exploration module 102 of FIG. 1. In this case, local computing functionality 202 implements the graph exploration module 102, e.g., as an application module that is locally stored by the local computing functionality 202. The local computing functionality 202 may represent any type of computing device, such as a personal computer, a computer workstation, a lap top computer, a game console device, a set-top box device, a personal digital assistant (PDA), a mobile telephone, a tablet-type computer, an electronic book-reader device, and so on. In this implementation, the local computing functionality 202 can interact with graph data stored in one or more local and/or remote data stores 104.

Figure 3:
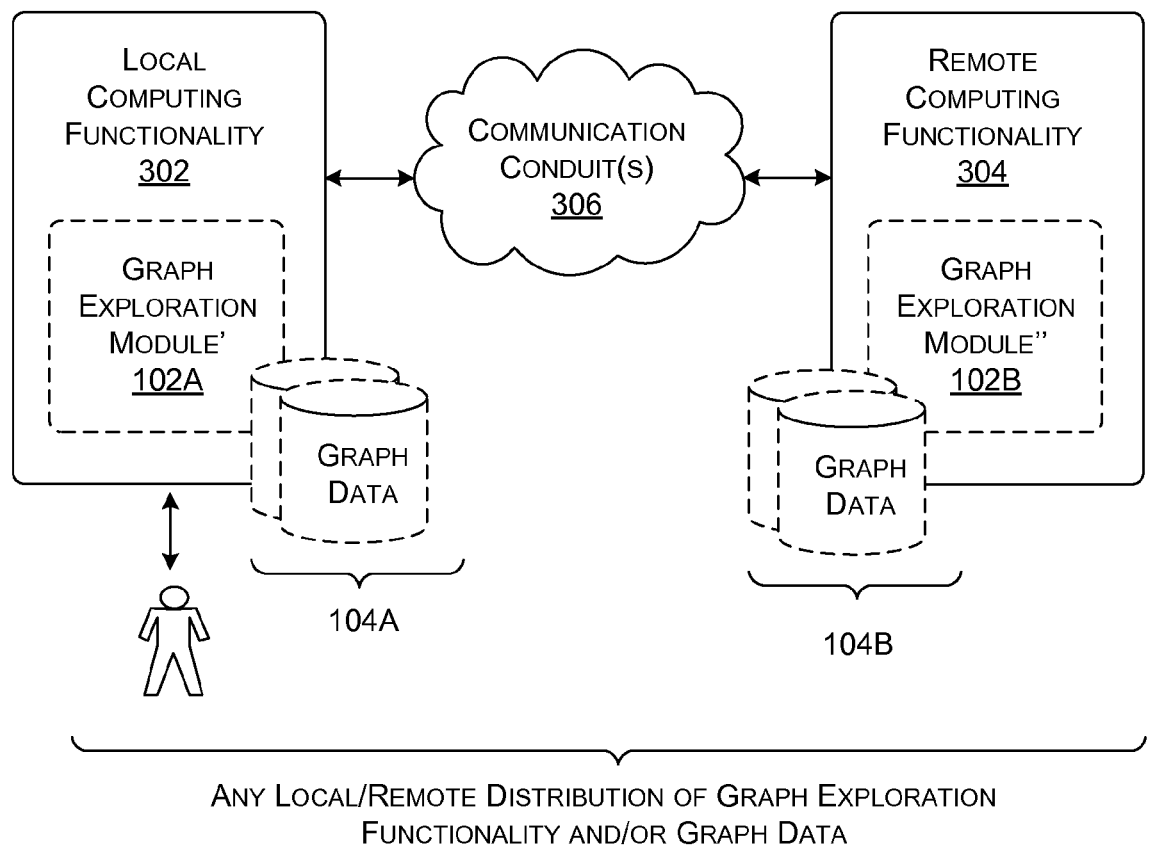

FIG. 3 shows another implementation of the graph exploration module 102. In this case, the graph exploration module and the graph data can be distributed between local computing functionality 302 and remote computing functionality 304 in any manner. For example, in one scenario, the local computing functionality 302 can provide a graph exploration module 102A, which has access to local graph data store(s) 104A and/or remote graph data store(s) 104B. In another scenario, the remote computing functionality 304 can provide a graph exploration module 102B, which has access to graph data store(s) 104A and/or graph data store(s) 104B. In another scenario, the graph exploration module can be implemented by a combination of the locally-implemented graph exploration module 102A and the remote-implemented graph exploration module 102B, with access to any of the graph data store(s) 104A and/or the graph data store(s) 104B. Still other implementations are possible.

In any of these scenarios described above with reference to FIG. 3, the user may interact with the graph exploration module via the local computing functionality 302. The local computing functionality 302 may represent any type of computing device described above (with respect to FIG. 2). The remote computing functionality 304 may represent one or more server computers and associated data stores, etc., provided at a central location or distributed over plural locations. A communication conduit 306 connects the local computing functionality 302 and the remote computing functionality 304. The communication conduit 306 represents any type of local area network, any type of wide area network (e.g., the Internet), any type of point-to-point connection, and so on, or any combination thereof.

FIG. 4 shows an example of one manner in which the graph data can be structured, and how this graph data can be leveraged to perform pivoting between related subgraphs. Consider, for example, the above-described case in which the entire corpus of graph data represents a collection of papers, created by authors, for presentation in various proceedings. In a particular exploration session, assume that a user produces a first exploration panel having a chart which presents a first subset 402 of the graph data. For example, the user may produce a chart based on papers pertaining to a particular topic or topics. In this case, the first subset 402 of graph data includes a first collection of paper nodes that can be conceptualized as a subgraph, where that subgraph represents part (or all) of an entire graph associated with the entire corpus of graph data.

Each paper node in the first subset 402 may include one or more edges that link it to one or more other respective nodes. Consider a particular paper node X in the first subset 402 that is associated with a paper x. That paper node X may include a link that points to an author node L that is associated with an author l who contributed to the paper x. The paper node X may include another link which points to another paper node M that is associated with a paper m cited in the paper x. The paper node X may include another link which points to another paper node N that is associated with a paper n which cites paper x, and so on. More generally, some of the links point to nodes having the same type as paper node X (that is, other paper nodes); other links point to nodes having a different type compared to the paper node X (such as author nodes).

A user may invoke a pivot-type selection to transition from the first subset 402 of graph data to another subset of data along a specified edge type. For example, the user may invoke the pivot-type selection to transition from the first subset 402 to a second subset 404 of graph data. The second subset 404 of graph data includes a second collection of nodes that are linked to the first collection of nodes by edges 406 of a type P. Alternatively, the user may invoke the pivot-type selection to transition from the first subset 402 of graph data to a third subset 408 of graph data. The third subset 408 of graph data includes a third collection of nodes that are linked to the first collection of nodes by edges 410 of a type Q. Upon reaching the third subset 408, the user may decide to pivot to yet another subset (e.g., a fourth subset 412) along a specified edge type.

To be more concrete, for example, the user can transition from the first subset 402 to the second subset 404, where the second subset 404 represents a collection of authors who are associated with the papers identified in the first subset 402. The edges 406 associated with this transition are paper-to-author edges. Or the user can transition from the first subset 402 to the third subset 408, where the third subset 408 represents a collection of papers which cite the papers in the first subset 402, or a collection of papers which are cited by papers in the first subset 402, and so on. The edges 410 associated with this transition are paper-to-citing-paper edges (in the former case) and paper-to-cited-paper edges (in the later case). The paper-to-citing-paper edges and the paper-to-cited-paper edges may be implemented as a single set of edges; the meaning of these edges differs when considered from different edge directions. The detailed scenario which follows will provide further details regarding the pivot-type selection.

In one implementation, the graph exploration module 102 can enable the above behavior by creating a list of node types. For each pair of node types, the graph exploration module 102 then creates a list of possible edges connecting the pair of node types, together with an indication of the directionalities of the edges. The graph exploration module 102 enables pivoting in either direction on each edge in the list of edges, although the verbs which describe the pivot action will differ for each direction. Consider the case in which a first type of node is connected to a second type of node along a specified edge. The graph exploration module 102 will give the user the opportunity to pivot to a specific set of the second type of nodes along the specified edge when the user is viewing a chart that is constructed based on a specific set of the first type of nodes. This is not to necessarily say, however, that every set of the first type of nodes has a counterpart set of nodes of the second type connected via the specified edge; hence, in some cases, pivoting along the specified edge may yield an empty chart. To be yet more concrete, a chart may identify a set of papers, none of which are cited by any other papers. Hence, although the user will be given the opportunity to attempt to pivot along paper-to-citing-paper edges, this operation will yield an empty chart, because there are no such edges in this particular instance which point to citing papers.

FIG. 4 also illustrates the nature of attributes that are associated with each node. For example, consider the first node X in the first subset 402, which describes the particular paper x. This paper node X has a collection of attributes which are directly associated with the paper x, such as paper ID, title, subtitle, starting page, ending page, etc. These attributes may be referred to as direct attributes. As indicated above, the paper node X is also linked to other nodes, such as one or more author nodes and one proceeding node, etc. Each of these linked nodes has their own direct attributes. Hence, the paper node X in the first subset 402 can be said to have a number of indirect attributes that are "imported" from its linked nodes, such as author name, author affiliation, proceeding id, proceeding location, and so on.

This implementation also implies that each attribute can have plural values. For example, an author node can be associated with multiple topics, e.g., pertaining to the topics of the papers he or she has written. This also means that the same author node can be potentially represented by plural aggregated results within a single chart. This, in turn, means that any given chart may include duplicate nodes.

Various interface features of an exploration panel can list the attributes of a particular type of node (such as a group-by interface feature described below), allowing a user to select from among the attributes. The exploration panel can include any type of indicia for discriminating between direct attributes and indirect attributes of a node type, such as by appending a prefix to the indirect attributes.

Figure 5:
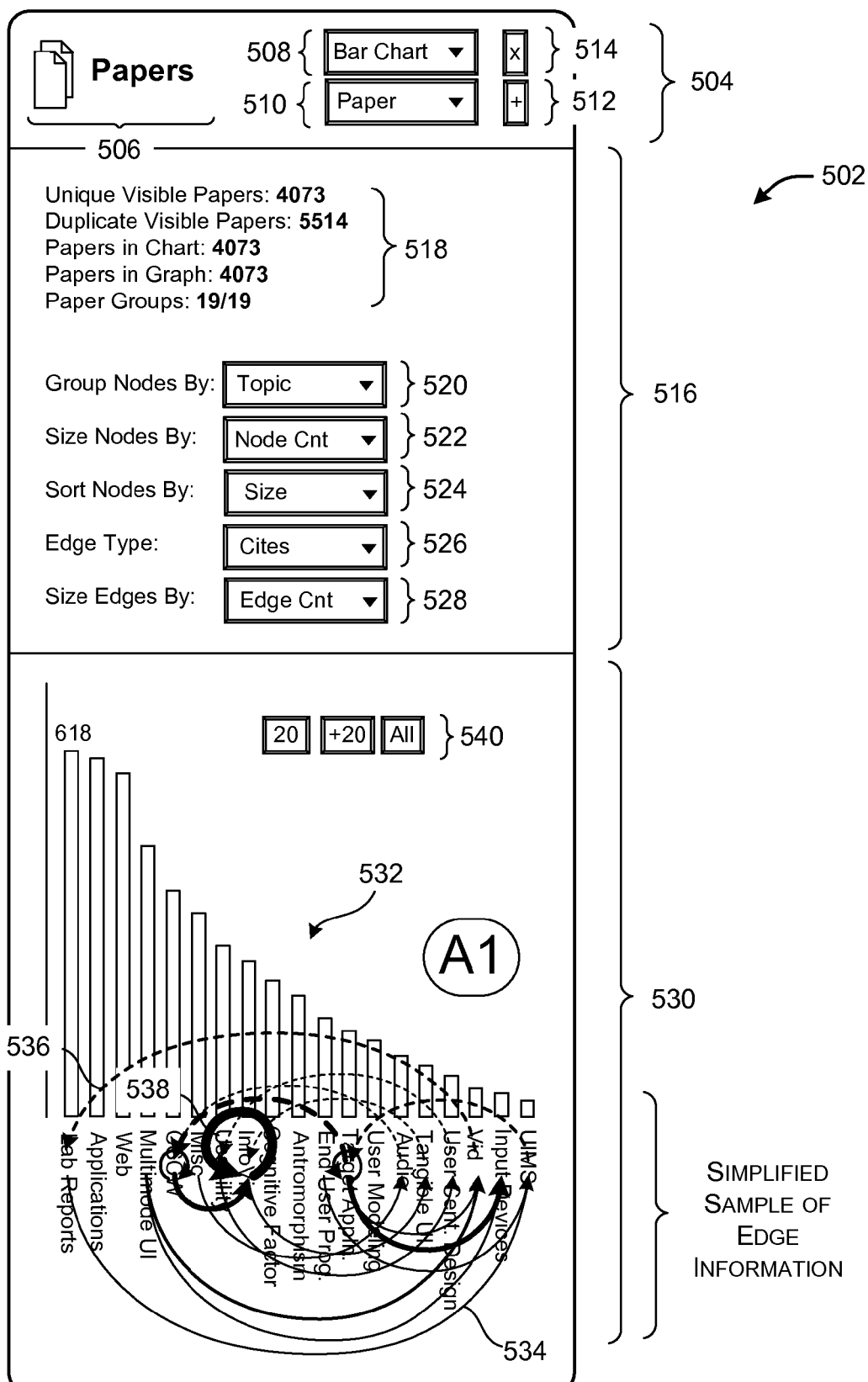
FIG. 5 shows an exploration panel that can be produced by the graph exploration module of FIG. 1. In particular, this exploration panel represents the graph data using a hybrid-type bar chart.

Advancing now to FIG. 5, this figure shows one example of an exploration panel 502. The exploration panel 502 presents a mechanism for: (a) presenting a visual representation of the graph data in a chart selected from a set of available chart types; and (b) allowing a user to interact with the chart. In one case, the graph exploration module 102 produces the exploration panel 502 as a graphical user interface presentation that is displayed on any type of display device, such as a computer monitor, a screen of a handheld device, etc.

Generally, the graph exploration module 102 can produce an exploration panel having any shape, look, feel, operability, and arrangement of features. For example, although FIG. 5 shows a rectangular exploration panel 502, the graph exploration module 102 can produce an exploration panel having any shape and size. Further, the shape and/or size may be adjustable.

The exploration panel 502 may include a plurality of sections. In this representative and non-limiting case, a top-most section 504 provides an overview of information conveyed by the exploration panel 502. For example, the top-most section 504 includes a display item 506 (e.g., comprising text and/or an icon, etc.) which indicates that the exploration panel 502 currently presents aggregate results pertaining to paper nodes within the graph data.

The top-most section 504 also includes high-level interface features which allow the user to modify the manner in which the graph data is presented. For example, the top-most section 504 includes chart-selection interface feature 508 which allows a user to select the type of chart that is used to present the graph data. Currently, as will be explained below, the user has opted to the present the graph data using a hybrid-type bar chart.

The top-most section 504 also includes a node-selection interface feature 510 which allows a user to make a pivot-type selection. In this example, the exploration panel 502 presents a chart based on a first collection of nodes associated with papers. The user can invoke the node-selection interface feature 510 to select a second collection of nodes that are linked to the first collection of nodes along a specified edge type.

More specifically, the user can use the node-selection interface feature 510 to transition from a first subgraph to a second subgraph, where the second subgraph is composed of paper nodes, author nodes, or proceedings nodes. In one implementation, the node-selection interface feature 510 can enumerate the different transition options using a drop-down menu or the like. Each option can identify an edge type that leads to a particular collection of linked nodes, such as, for the case of paper nodes: (1) authors of the papers; (2) proceedings of the papers; (3) papers cited by these papers; (4) papers that cite these papers, etc.

The top-most section 504 also includes a clone-selection interface feature 512 which allows a user to invoke a clone-type selection. Once invoked, the graph exploration module 102 will produce a second exploration panel (not shown) which is a duplicate version of the exploration panel 502. The illustrative exploration session described below will set forth an illustrative context in which a user may wish to invoke this command. Finally, the top-most section 504 includes a close interface feature 514 which removes the exploration panel 502 from the exploration canvas 112 (when the exploration panel 502 has no children).

A mid-level section 516 of the exploration panel 502 presents additional information that pertains to the visual rendering of the graph data, as well as additional interface features for modifying the visual rendering. For example, the mid-level section 516 includes textual information 518 which describes the high-level characteristics of the chart that is presented by the exploration panel 502. In this particular case, the textual information 518 indicates that the chart is formed based on 4073 unique visible papers and 5514 duplicate visible papers. More specifically, any particular paper node that is represented in the chart may contribute to two or more aggregated results in the chart. The "unique visible papers" entry indicates the number of unique paper nodes in the chart that are currently visible in the exploration panel 502. The "duplicate visible papers" entry indicates the number of redundant paper nodes in the chart that are currently visible in the exploration panel 502. The textual information 518 further indicates that there is a total of 4073 papers represented in the chart and a total of 4073 papers associated with the entire corpus of graph data. The textual information 518 further indicates that the chart includes 19 of a total of 19 node groups, meaning that all of the paper nodes associated with the chart are visibly represented in the chart at this time. Each node group, in turn, represents an aggregation of nodes.

The mid-level section 516 also includes a group-by interface feature 520 which specifies a grouping criterion for forming the node groups. Currently, the user has opted to form aggregations of paper nodes based on paper topics. The mid-level section 516 also includes a size-by interface feature 522 which specifies a size-by criterion for assessing the size of a node group. Currently, the user has opted to represent the size of a node group based on the number of nodes in the group. More generally, any function or paradigm can be used to represent the size of a node group. Other sizing options include an average metric for a group of nodes, a minimum metric for the group of nodes, a maximum metric for the group of nodes, etc. The size-by criterion can also be defined with respect to any attribute(s) associated with the nodes in a group, rather than, or in addition to, the number of nodes in the group. The mid-level section 516 also includes a sort-by interface feature 524 which specifies a criterion for sorting the node groups. Currently, the user has opted to sort the node groups based on the sizes of the node groups, e.g., by sorting the node groups from largest to smallest. The mid-level section 516 also includes an edge-type-selection interface feature 526 for selecting the type of edges represented by the chart. Currently, the user has opted to form aggregations based on paper-cite edges in the graph data. The mid-level section 516 also includes another size-by interface feature 528 which specifies a criterion for assessing the size of an aggregation of edges. Currently, the user has opted to represent the size of an aggregation of edges based on the number of edges in that aggregation, but this criterion can be specified using any function(s) and/or attribute(s). Generally, at least some of the selections made via the mid-level section can be regarded as presentation selections which govern the arrangement of graph data presented in the selected chart.

A lower section 530 presents aggregate results generated by the graph exploration module 102 within a chart. Here, the chart is a hybrid-type bar chart 532. Generally stated, the hybrid-type bar chart 532 includes a plurality of node-aggregation signifiers which represent respective groups of nodes. The hybrid-type bar chart 532 also includes a plurality of edge-aggregation signifiers which represent respective aggregations of edges. More specifically, in one implementation, the hybrid-type bar chart 532 represents the node-aggregation signifiers as a plurality of bars. The hybrid-type bar chart 532 represents the edge-aggregation signifiers as a plurality of links which connect the bars together.

Still more specifically, in this scenario, the height of each bar represents a number of paper nodes associated with a particular topic (based on the specified size-by criterion). The hybrid-type bar chart 532 arranges the bars from largest to smallest based on the number of paper nodes in each topic according to the sort-by criterion. Each link represents an aggregate number of citations from papers in one topic (associated with one bar) to papers in another topic (associated with another bar).

The graph exploration module 102 can use any visual attribute(s) to present the number of edges associated with a link. Further, the graph exploration module 102 can present the directionality of a link using any visual attribute(s). For example, in the particular case shown in FIG. 5, the hybrid-type bar chart 532 represents the size of an aggregation of edges based on the thickness of the corresponding link. In addition, or alternatively, the hybrid-type bar chart 532 can represent the size of a link based on the coloring and/or shading applied to the link. In one case, the hybrid-type bar chart 532 represents the directionality of a link using an arrow. In addition or alternatively, the hybrid-type bar chart 532 can represent the directionality of a link based on a coloring and/or shading applied to the link, e.g., by transitioning from a first color to a second color to denote the directionality of the link. In addition, or alternatively, a first grouping of links can be pointed in a first direction (e.g., right to left, as shown in the top grouping of links in FIG. 5) and a second grouping of links can be pointed in a second direction (e.g., left to right, as shown in the bottom grouping of links). The graph exploration module 102 can use any type of visualization strategy to order the links, e.g., by defining the manner in which certain links overlie (or underlie) other links. In one instance, the graph exploration module 102 can present smaller links on top of larger links so as not to obscure the smaller links, etc.

In the example of FIG. 5, a link 534 represents paper citations in a "Lab Reports" topic that point to papers in a "UIMS" topic. A link 536 represents paper citations in a "Vid" topic that point to papers in the "Lab Reports" topic. A link 538 represents paper citations in an "InfoVis" topic that point to other papers in that same InfoVis topic, and so on. The link 538 is particularly thick, indicating that this link represents a relatively large number of edges (i.e., paper citations).

By virtue of the hybrid-type bar chart 532, a user can be simultaneously apprised of both the size of each node group and the relationship of each node group to each of the other node groups. This facilitates the user's understanding of the basic nature of the graph data.

To repeat, although a hybrid-type bar chart is depicted in FIG. 5, the user can operate the chart-selection interface feature 508 to select another type of chart. Illustrative other available charts include a tag cloud chart, a matrix chart, and a table chart, a scatter-plot chart, a node-link chart, etc. (this list being representative, rather than exhaustive). One illustrative tag cloud chart represents the size of each node group based on a size of a textual label associated with the node group. One illustrative matrix chart represents the size of each node group based on any type(s) of variable attribute(s) of a signifier that is placed in a cell defined by two or more axes, such as a size of a circle that is placed in the cell, a color and/or shade of the cell, etc. For example, one type of matrix chart can list universities A, B, C, and D across a first axis and the same list of universities (i.e., A, B, C, and D) across a second orthogonal axis. The size of an icon placed at a particular location within a space defined by these axes corresponds, for instance, to a number of paper citations from a first university to a second university (where the first university and the second university are defined by the row and column positions, respectively, of the icon). One illustrative table chart provides detailed textual information and/or other information regarding the nodes and/or edges in the graph data, presented in any type of table format.

As a final point, the hybrid-type bar chart 532 presents all node groups associated with all topics (e.g., in this case, all 19 of a total of 19 node groups). In other cases, a chart may present only a portion of a total number of node groups that have been generated. In that case, a user can invoke a set-selection interface feature 540, causing the graph exploration module 102 to regenerate the chart with additional nodes groups.

The exploration panel 502 can incorporate other mechanisms for investigating the graphical data represented in the chart 532. For example, although not shown, the exploration panel can include an interface feature for receiving a textual search query. The graph exploration module 102 can respond to the search query by identifying particular results in the chart 532 that match the search query, meaning that these results include underlying graph data that matches the search query. Such a search query can alternatively prompt the graph exploration module 102 to generate another exploration panel which focuses on the parts of the chart 532 that satisfy the search query.

In addition, or alternatively, the exploration panel 502 can incorporate any number of widget-like interface features which allow a user to enter filtering criteria. Such widget-like interface features can include slider mechanisms for entering adjustable ranges of filtering criteria, checkboxes or the like for identifying discrete filtering criteria, and so on.

A.2. Representative Exploration Session

Figure 15:
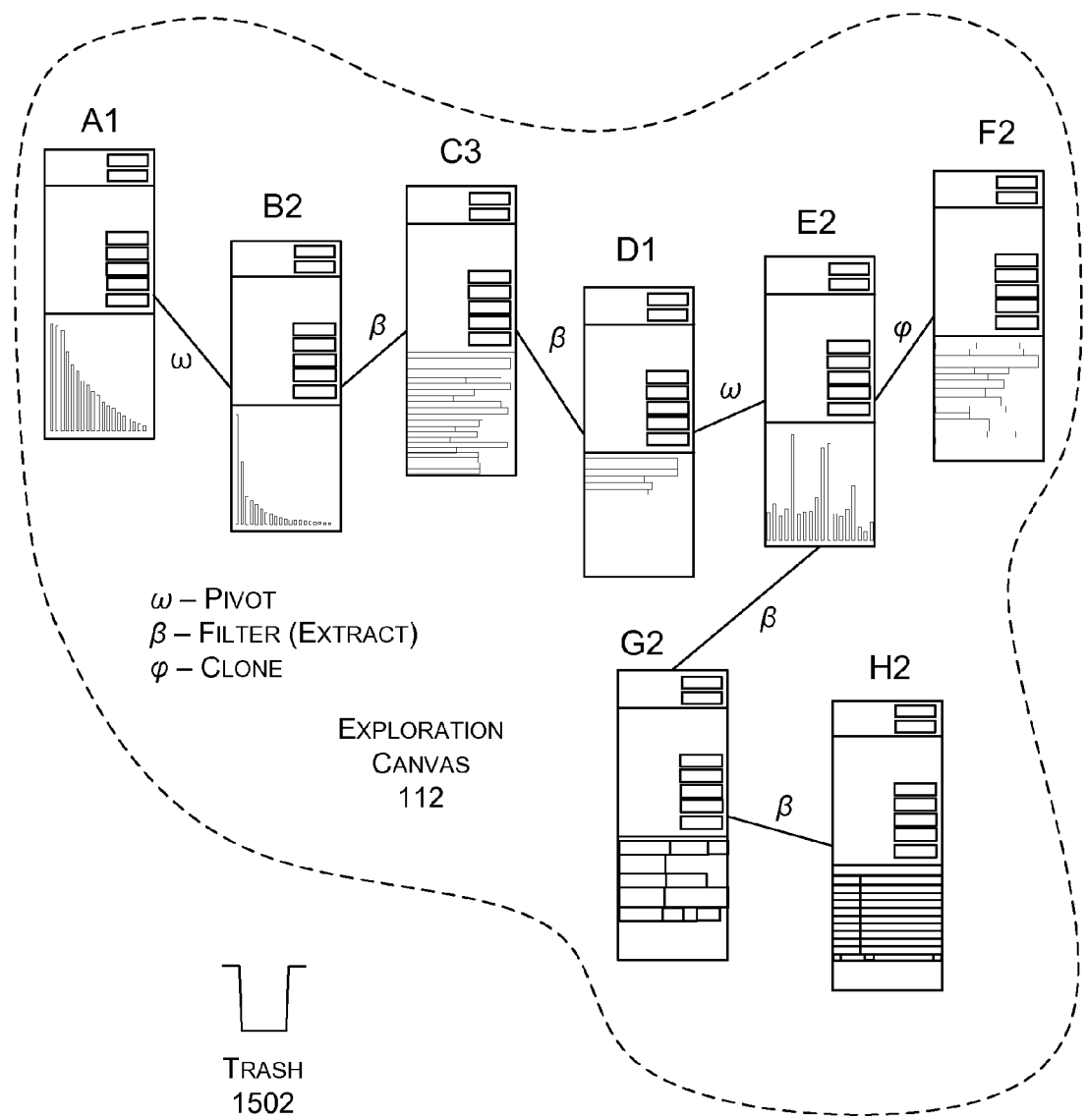
FIG. 15 shows an overview of exploration paths produced by the sequence of exploration panels in FIGS. 6-14.
Figure 16:
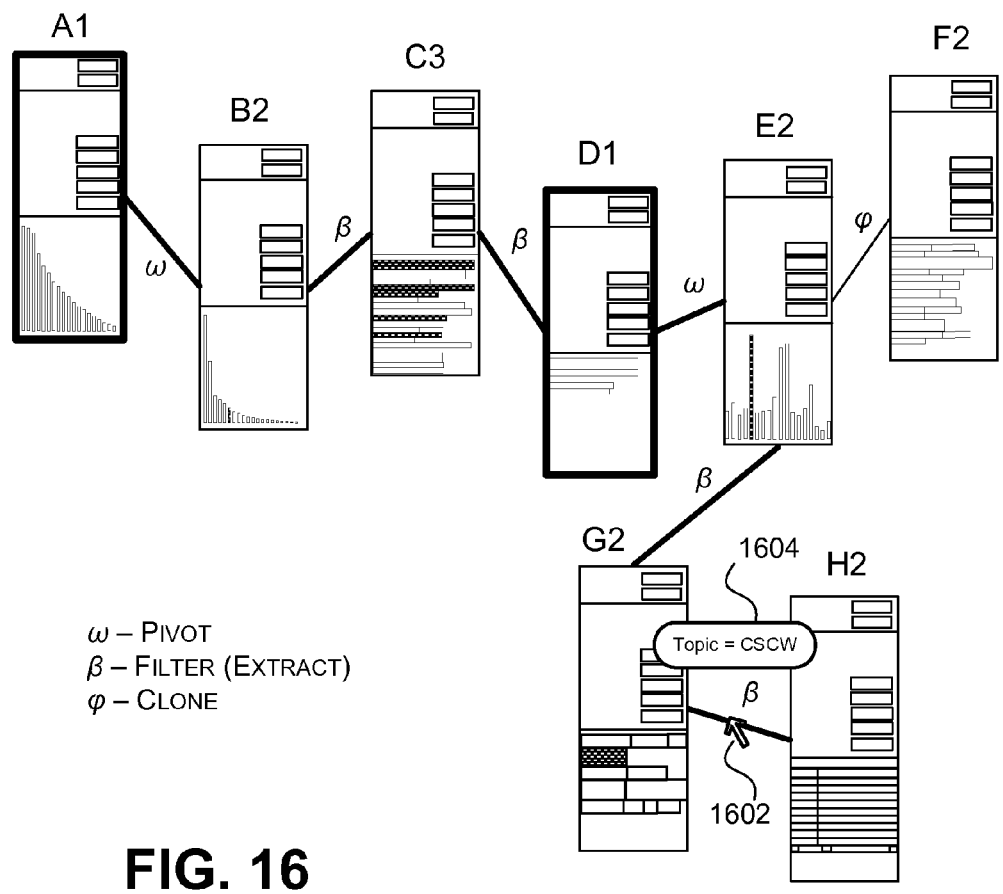
FIG. 16 shows one manner by which the graph exploration module can selectively highlight portions of the exploration paths shown in FIG. 15, based on the selection of a particular point within the exploration paths.

FIGS. 6-14 show a series of exploration panels that the graph exploration module 102 displays on the exploration canvas 112 in the course of an exploration session. FIGS. 15 and 16, to be discussed in turn, present a high-level view of all the exploration panels that are presented on the exploration canvas 112 at the completion of the exploration session. Labels "A1" through "H2" are assigned to respective exploration panels to assist in the later identification of a subset of these panels.

Figure 6:
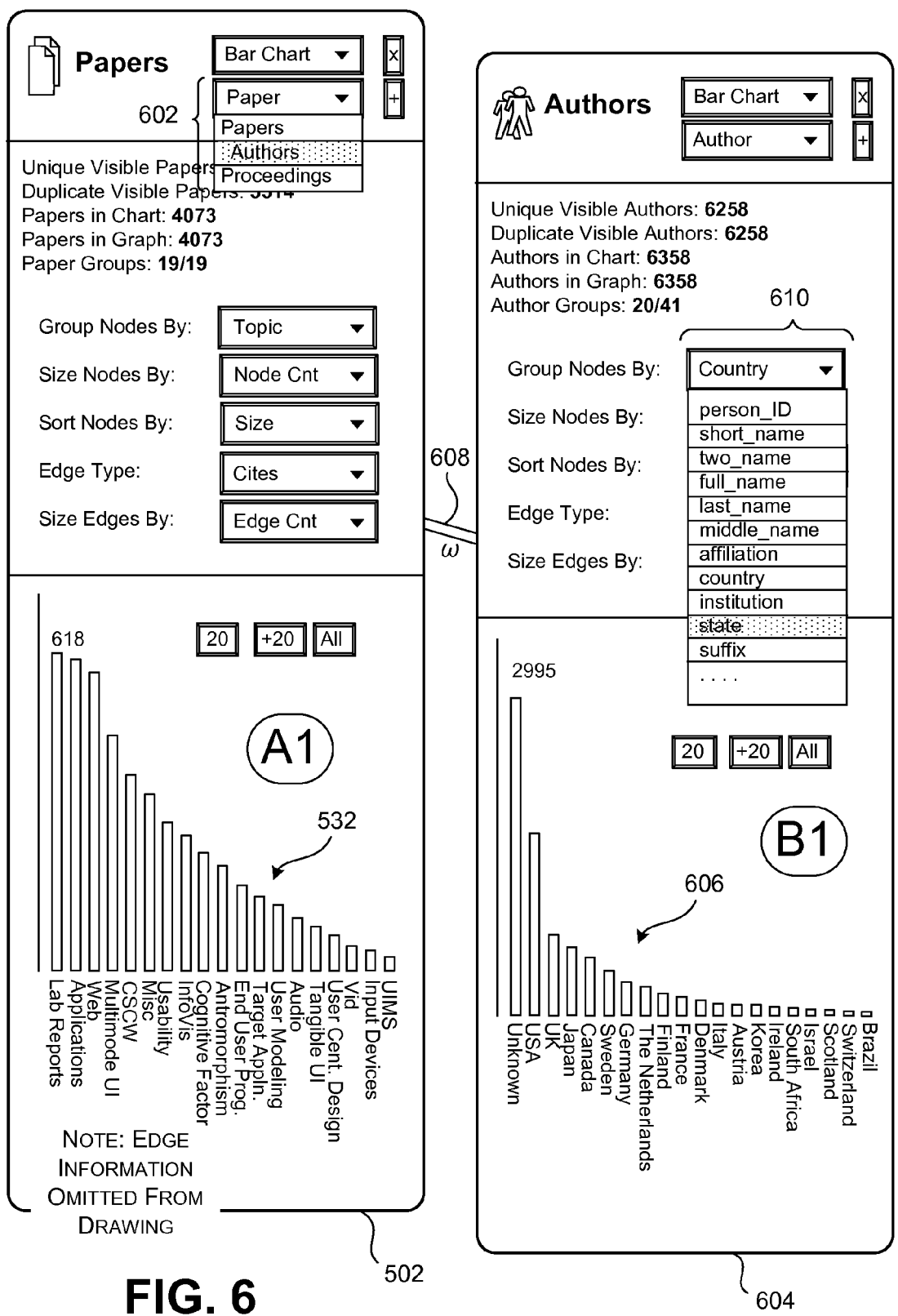
FIGS. 6-14 show a series of exploration panels that can be produced in an illustrative exploration session.

Beginning with FIG. 6, assume that the user begins by generating the initial exploration panel 502 described above with respect to FIG. 5. To repeat, this exploration panel 502 presents a hybrid-type bar chart 532 that shows topic-related aggregations of paper nodes. So as not to unduly encumber the depiction, FIG. 6 (and the reminder of the figures) omit the links which show the relationships between the node aggregations. A user may also purposely suppress these links by selecting an appropriate "no edge" option provided by the edge-type-selection interface feature 526.

Assume next that the user wishes to produce a chart that is based on author nodes, where those author nodes are linked to the paper nodes shown in the exploration panel 502. To perform this task, the user may invoke the node-selection interface feature 602 to enter a pivot-type selection, namely selecting author nodes instead of paper nodes. For example, in one case, the node-selection interface feature 602 may represent a drop-down menu or other graphical selection mechanism that shows the available types of edges which link to different respective collections of nodes. Here, the user has selected an "author" entry in the drop-down menu, which is a shorthand representation for a paper-to-author type of edge. In this particular example, the node-selection interface feature 602 presents an abbreviated list of possible edge-transition types; although not shown, the user can also use the node-selection interface feature 602 to select a linked collection of paper nodes.

The selection of author nodes prompts the graph exploration module 102 to produce an entirely new exploration panel 604 shown on the right part of FIG. 6. The new exploration panel 604 includes a bar chart 606 that represents aggregations of author nodes, instead of paper nodes. A link 608 connects the previous exploration panel 502 to the new exploration panel 604. The link 608 can have at least one visual attribute which denotes the type of action (namely a pivot-type action) that was invoked to produce the new exploration panel 604. For example, the visual attribute may correspond to a particular color, here denoted by the letter ω.

Currently, the node groups in the bar chart 606 are grouped based on a country criterion, which may represent an initial default criterion. Assume now that the user wishes to change the grouping criterion to state. To do so, the user activates a group-by interface feature 610 to change the grouping criterion from country to state.

Figure 7:
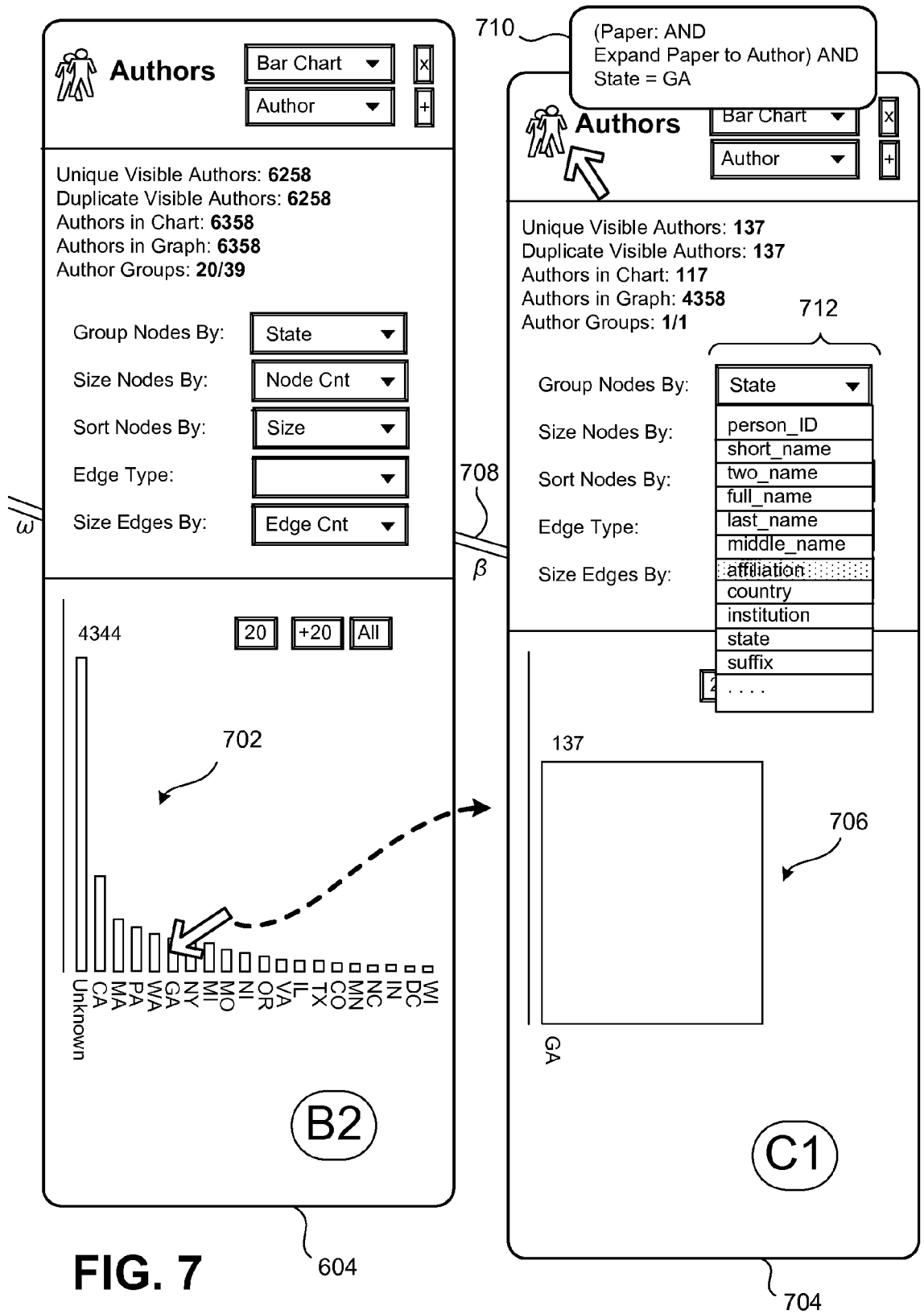
Figure 8:
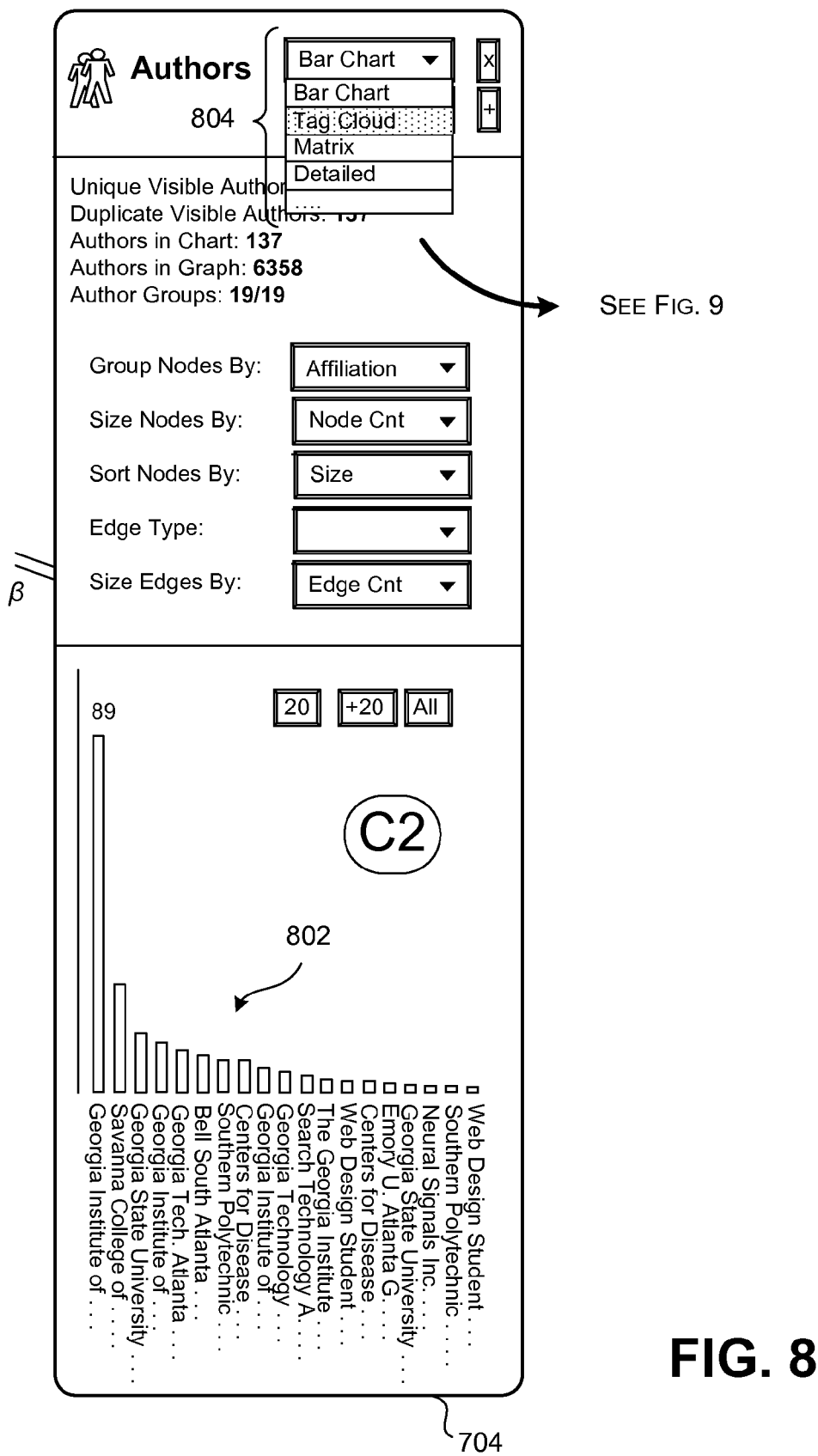
Figure 9:
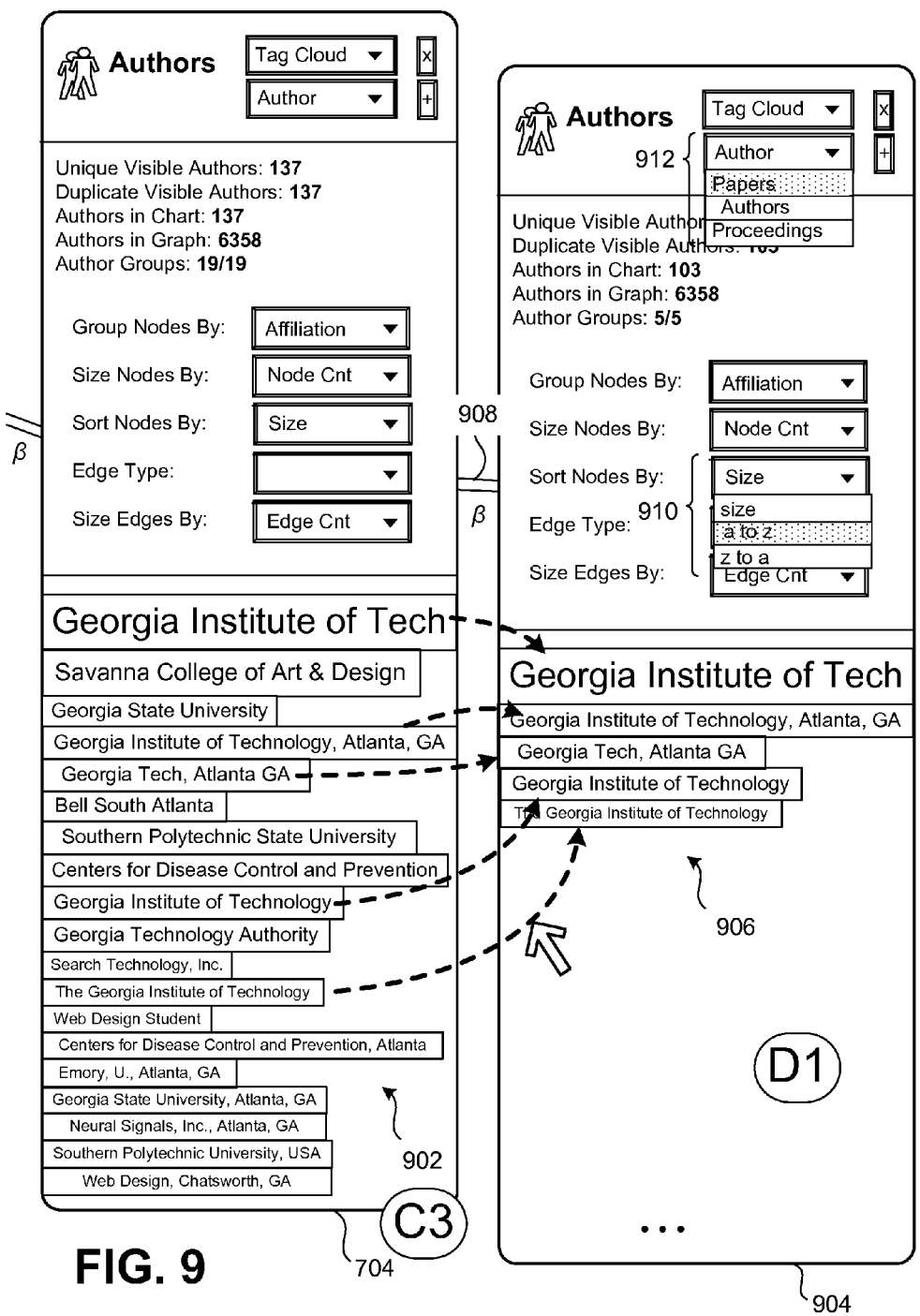
Figure 10:
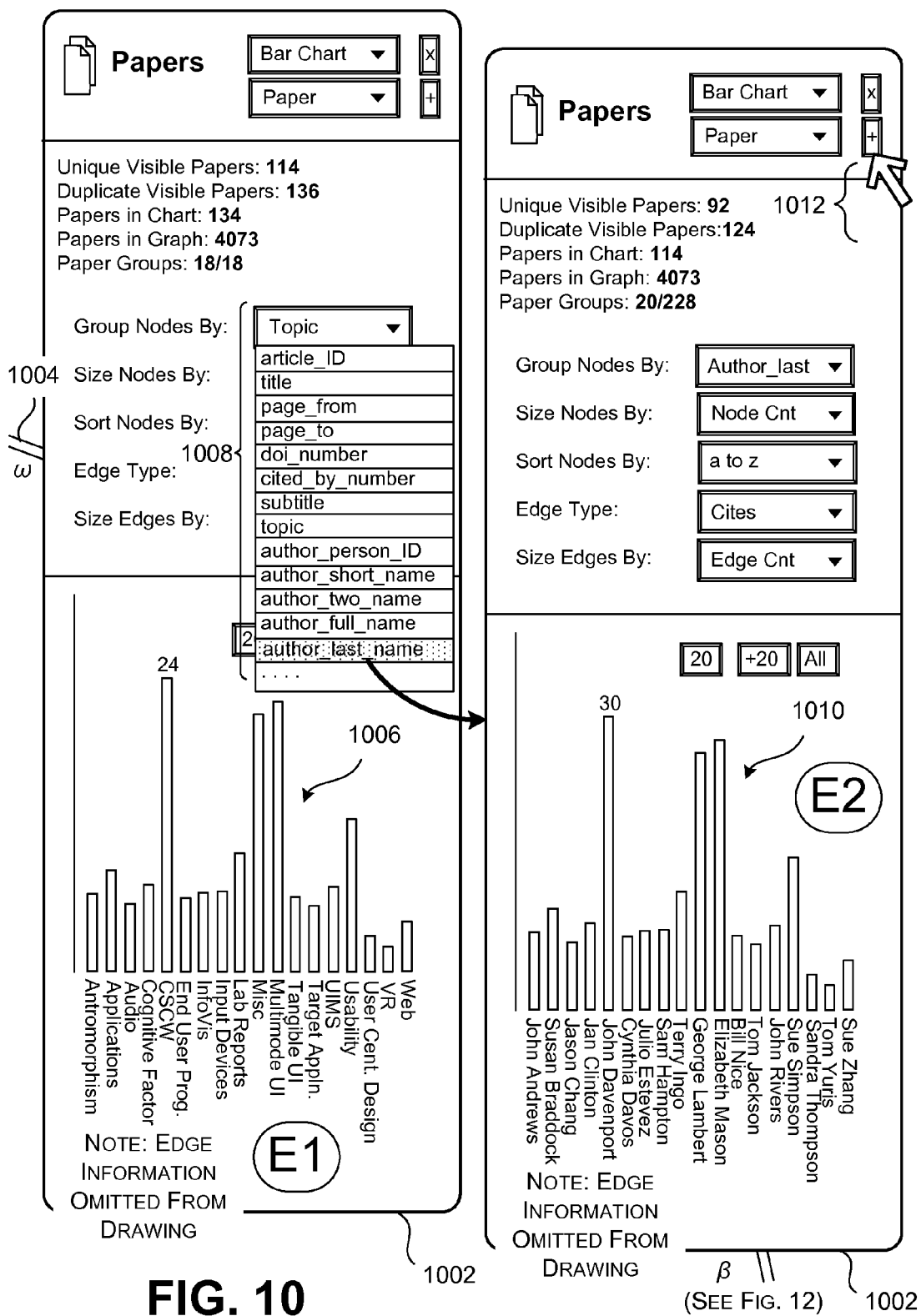

FIG. 7 shows a new bar chart 702 produced by the selection made via the group-by interface feature 610 of FIG. 6. As shown, the new bar chart 702 now forms groups based on the state affiliation of author nodes. In one implementation, the graph exploration module 102 presents the new bar chart 702 in the context of the existing exploration panel 604 introduced in FIG. 6. That is, the graph exploration module 102 does not produce a new exploration panel in this circumstance (although, in other implementations, it can be configured to produce a new exploration panel in this circumstance).

Now assume that the user wishes to examine the subset of author nodes associated with a GA (Georgia) grouping. To do so, the user can use a mouse device (or other input mechanism) to select the bar associated with the GA grouping, and then drag this bar out to produce another exploration panel 704. This exploration panel 704 initially presents a bar chart 706 having a single bar representing the author nodes associated with the state of Georgia. Although not shown, the user can perform a similar dragging movement to extract an edge from the bar chart 702 in the exploration panel 604. This prompts the graph exploration module 102 to extract the nodes that are associated with the extracted edge; those nodes may represent a subset of the nodes represented by the two bars connected together by the extracted edge. Further, although not shown, the user can repeatedly perform this dragging operation to select multiple bars and/or multiple edges from one or more exploration panels, which forms a union of the multiple bars and/or multiple edges. Further still, the user can pull parts from two or more charts presented in two or more exploration panels. Generally, this type of operation is referred to herein as a filtering-type selection. A link 708 represents the connection between the previous exploration panel 604 and the new exploration panel 704. The link is labeled using the letter β to denote a filtering-type action.

The graph exploration module 102 can also present information 710 that provides a textual explanation of the logical operations that yield the exploration panel 704. This textual explanation may encompass all prior operations that contribute to the presentation of the exploration panel 704. In one case, the exploration panel 704 can present such a logical explanation as a permanent field in the exploration panel 704. In another case, the graph exploration module 102 can invoke this logical explanation when the user moves the mouse over a particular field of the exploration panel 704, and so on. Further, in one case, the user can directly modify the textual explanation in the information 710, e.g., by adding a filtering term, removing a filtering term, etc. This causes changes to the filtering criteria applied to the chart 706, and hence, may change the graph data that is represented in the chart 706. In other words, this operation may act to supplement and/or replace the selection of filtering criteria using the drop-down interface features described with reference to FIG. 5. Alternatively, in some cases, a change in the textual explanation in the information 710 may prompt the graph exploration module 102 to generate a new exploration panel.

It another application, the user can create a new textual explanation, e.g., by authoring it from "scratch" or by pasting it in from another source. This prompts the graph exploration module 102 to generate an exploration panel (and associated chart) which shows the effects on the textual explanation on the graph data, or a series of linked exploration panels showing different steps of the logical operations defined by the textual explanation.

Now assume that the user wishes to group the author nodes in the bar chart 706 by affiliation. To do so, the user activates a group-by interface feature 712 and selects the entry "affiliation." This yields the bar chart 802 shown in FIG. 8. Again, in one implementation, the graph exploration module 102 generates the new bar chart 802 in the context of the same exploration panel 704 introduced in FIG. 7, rather than producing a new exploration panel.

Now assume that the user wishes to change the type of chart that is used to represent the graph data from a bar chart to a tag cloud chart. To do so, the user invokes the chart-selection interface feature 804 and selects the entry "Tag Cloud." This action produces the tag cloud chart 902 shown in FIG. 9. Once again, the graph exploration module generates the new tag cloud chart 902 in the context of the same exploration panel 704 introduced in FIG. 7, rather than producing a new exploration panel. The new tag cloud chart 902 shows various institutions in the state of Georgia.

At this juncture, now assume that the user wishes to further explore the graph data associated with the Georgia Institute of Technology in Atlanta, Ga. ("Georgia Tech"). As can be seen from the tag cloud chart 902, there are five entries that correspond to this institution. Each entry identifies the institution Georgia Tech in a slightly different manner. To extract these entries, the user can successively drag each of the Georgia Tech entries into a new exploration panel 904 (which is created as a result of the first dragging operation) to create a union of the extracted entries. Although not shown, a user can perform a similar dragging operation by pulling entries from multiple different source exploration panels. A resultant tag cloud chart 906 in the exploration panel 904 includes the five entries in the original tag cloud chart 902 that correspond to the institution Georgia Tech. The graph exploration module 102 also produces β-type link 908 which connects the previous exploration panel 704 to the new exploration panel 904.

Now assume that the user wishes to re-sort the groups in the tag cloud chart 906 according to alphabetical order (rather than size). To do so, the user interacts with the sort-by interface feature 910. (The immediate result of this action is not shown in FIG. 9.) Next assume that that the user wishes to pivot back to a paper-node representation of the graph data, rather than an author-node representation. This will reveal a collection of paper nodes that are linked to the author nodes represented by the chart 906. To do so, the user interacts with the node-selection interface feature 912, selecting the "Papers" entry. This action produces a new exploration panel 1002 shown in FIG. 10. The new exploration panel 1002 is connected to the previous exploration panel 904 via a ω-type link 1004 (indicating another pivot-type action).

A bar chart 1006 shown in the exploration panel 1002 groups the nodes by topic. Assume that the user wishes to alternatively form groups based on the last names of authors who are associated with the papers. To do so, the user invokes a group-by interface feature 1008, selecting the "author_last_name" entry in the drop-down menu (where "author_last_name" is one example of the above-described indirect attributes of a paper-type node). This action produces a new bar chart 1010, shown at the right portion of FIG. 10, within the same exploration panel 1002.

Now assume that the user wishes to produce a tag cloud representation of the graph data shown in the bar chart 1010, in side-by-side comparison to the bar chart 1010. To do so, the user may activate a clone-selection interface feature 1012. This action yields an entirely new exploration panel 1102, shown in FIG. 11. The new exploration panel 1102 is an exact duplicate (i.e., clone) of the previous exploration panel 1002 shown in FIG. 10. A link 1104 represents the transition from the exploration panel 1002 to the exploration panel 1102. The link 1104 is labeled with the letter φ, which denotes a clone-type action. At this juncture, the user may interact with a chart-selection interface feature 1106 to change the bar chart 1010 to a tag cloud chart 1108, as shown in the left part of FIG. 11.

Figure 11:
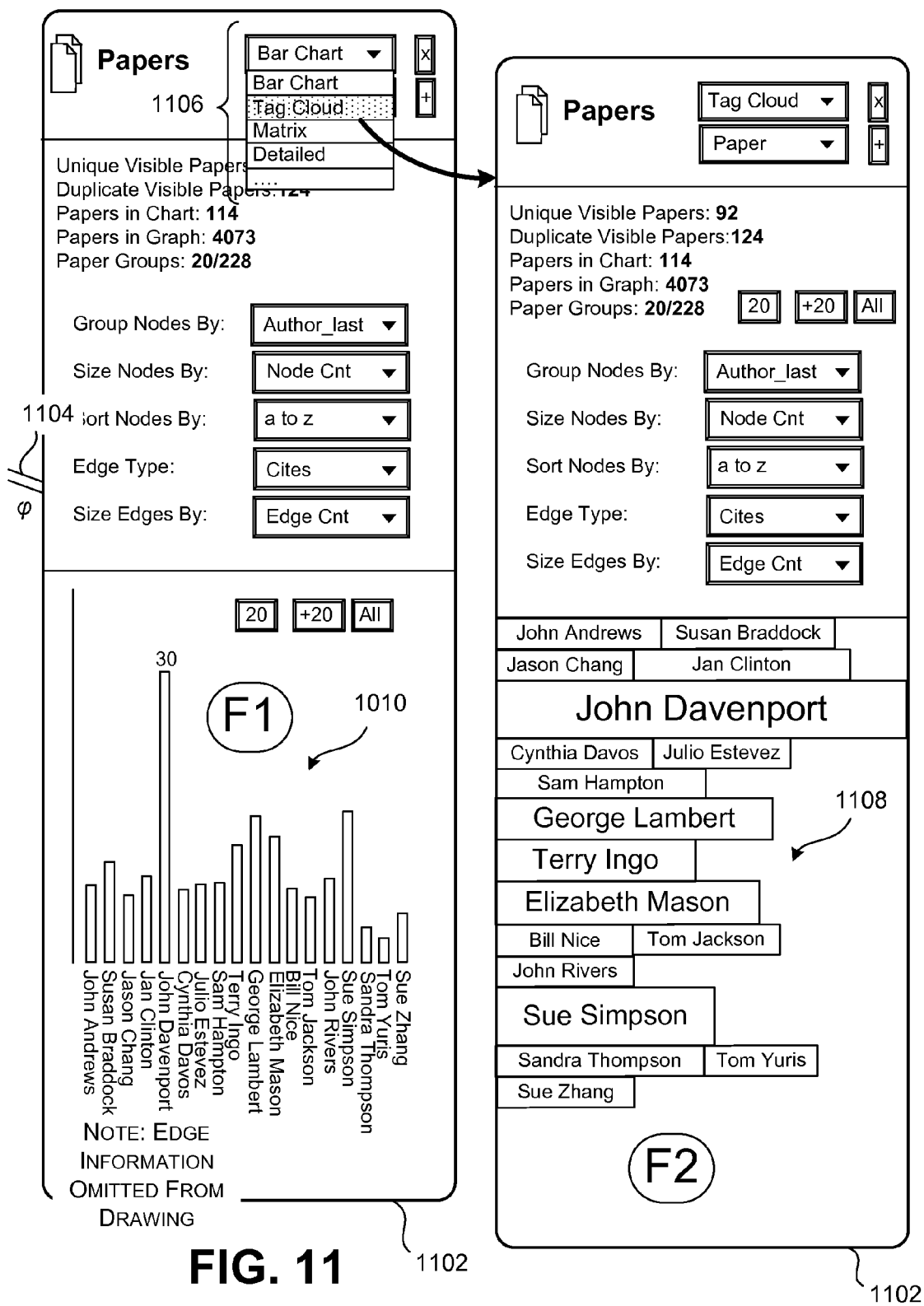
Figure 12:
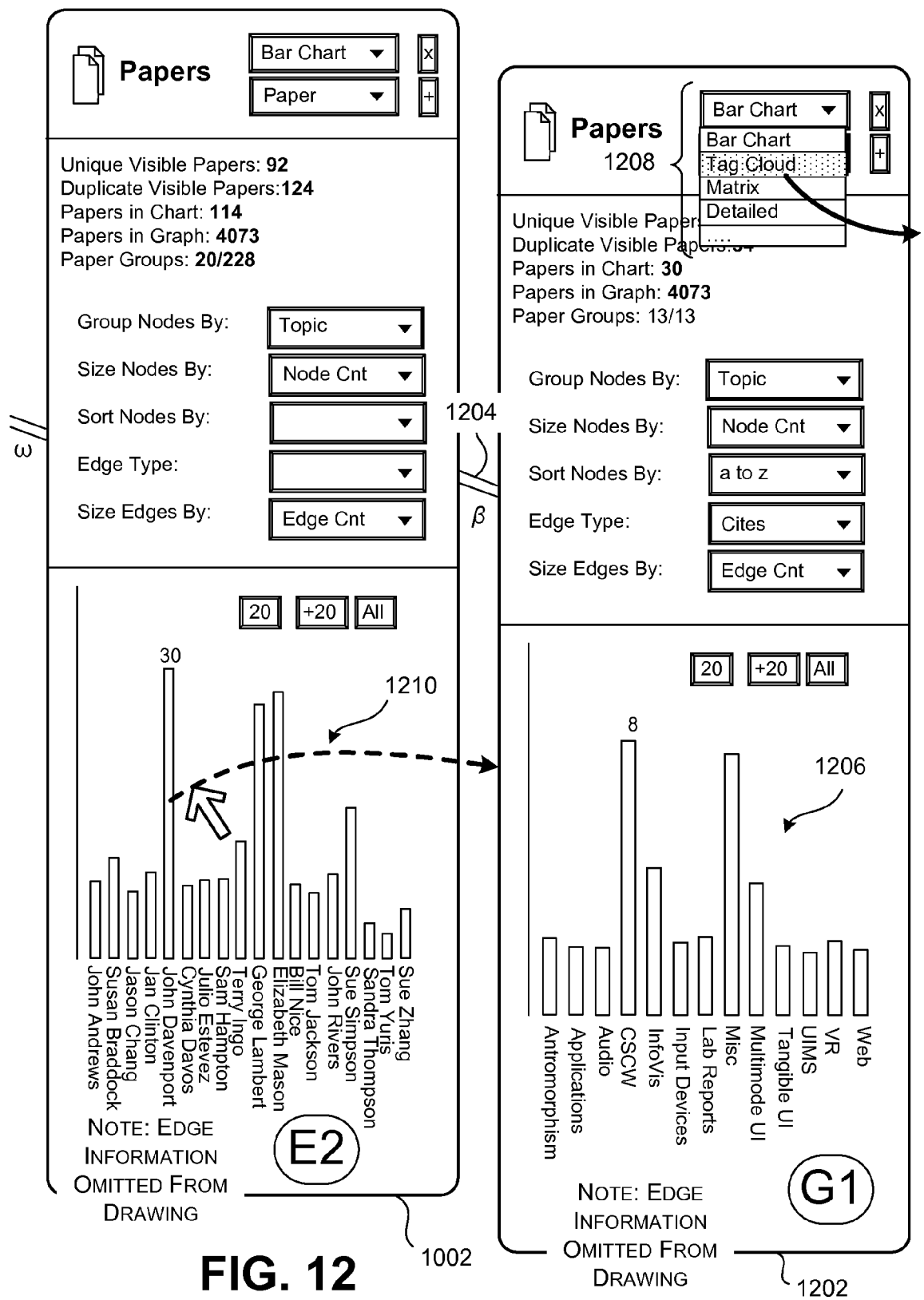
Figure 13:
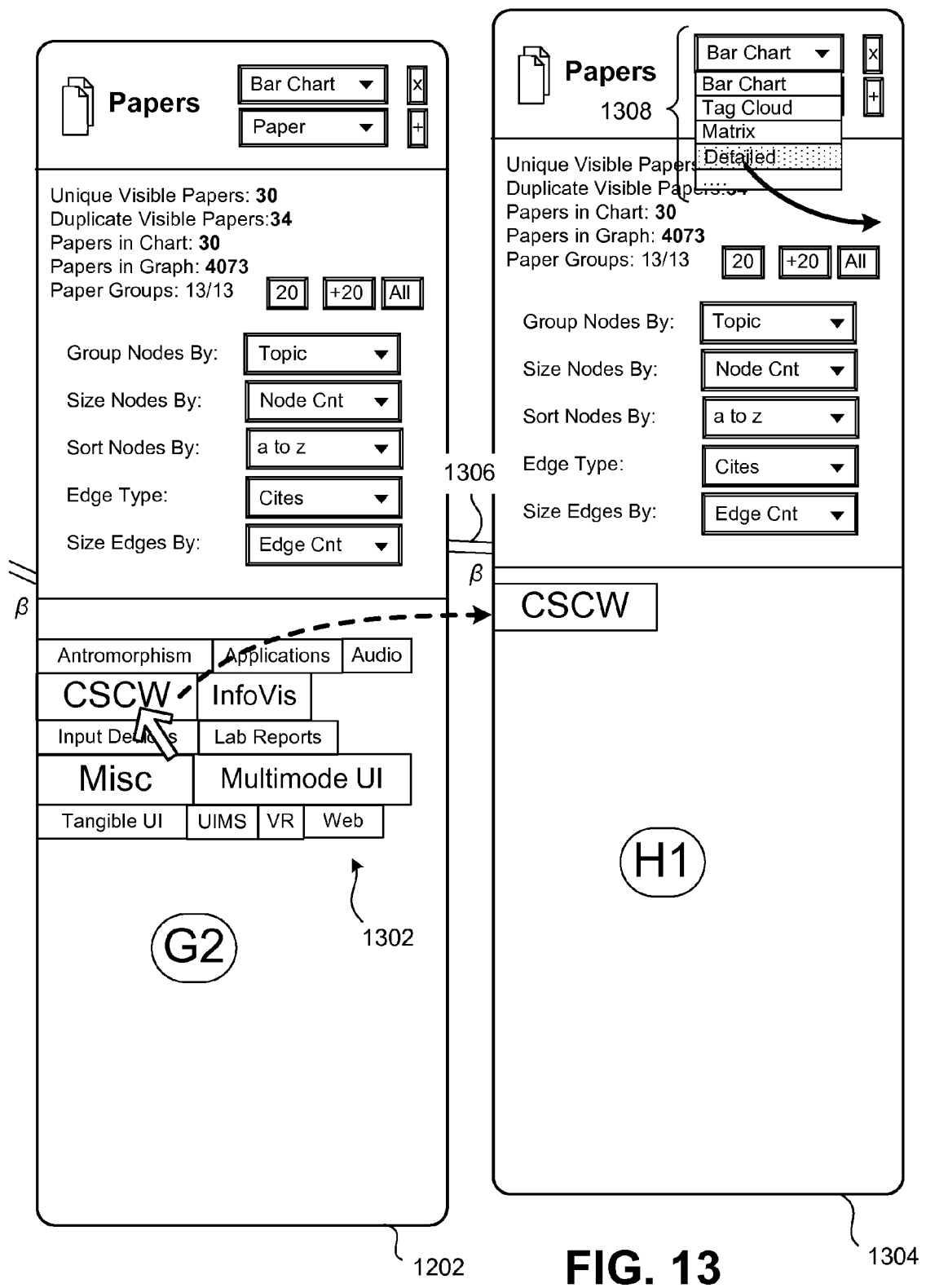

The exploration panel 1102 shown in the right part of FIG. 11 represents a terminal panel in one branch of the exploration session. Now assume that the user returns to the exploration panel 1002 shown in the right part of FIG. 10. This exploration panel is reproduced in the left part of FIG. 12. In the context of that exploration panel 1002, assume that the user wishes to explore the papers that are associated with a particular author, namely, the hypothetical "John Davenport." To do so, the user may drag the bar associated with this author out, to produce yet another exploration panel 1202 shown in the right part of FIG. 12, which is linked to the prior exploration panel 1002 via a β-type link 1204. The exploration panel 1202 includes a bar chart 1206 which sorts the papers written by John Davenport by topic. Now assume that the user wishes to produce a tag cloud representation of the information imparted by the bar chart 1206. To do so, the user may interact with a chart-selection interface feature 1208, selecting the tag cloud option. This yields a new tag cloud chart 1302 shown in the left part of FIG. 13, in the context of the same exploration panel 1202 introduced in FIG. 12.

Now assume that the user wants to produce a still more focused review of papers written by John Davenport in the topic of "CSCW." To accomplish this goal, the user can drag the tag "CSWC" out of the tag cloud chart 1302 onto the exploration canvas 112, thereby creating a new exploration panel 1304. The new exploration panel 1304 is linked to the previous exploration panel 1202 by a β-type link 1306.

Finally, assume that the user wishes to examine detailed information pertaining to the papers associated with the author John Davenport in the topic of CSCW. To do so, the user can interact with the chart-selection interface feature 1308 to select a table chart. This yields a table chart 1402 shown in FIG. 14.

Figure 14:
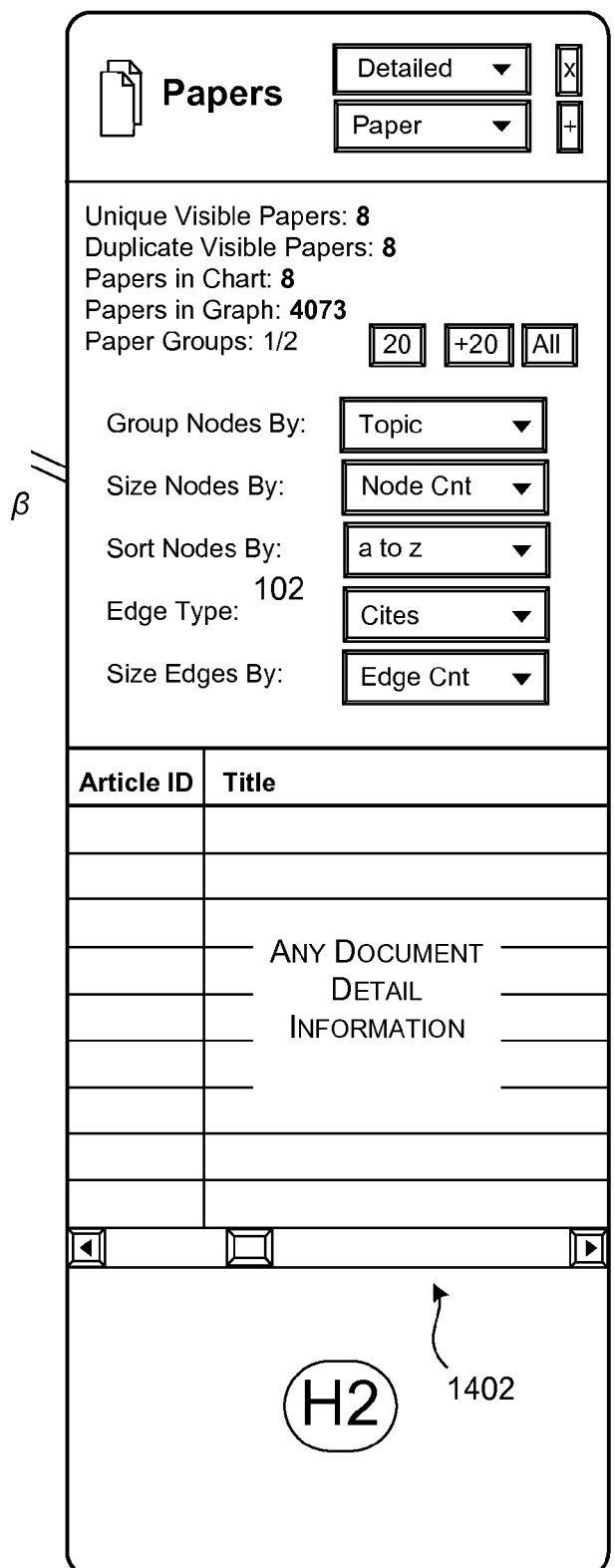

FIG. 14 represents the last-generated exploration panel in this particular illustrative exploration session. In one case, the graph exploration module 102 can allow a user to later revise (and add to) any leaf panel in an exploration session. But, in one implementation, the graph exploration module 102 may prevent a user from modifying any intermediary panel in an exploration sessions, e.g., where such intermediary panel is a parent or ancestor to other "downstream" (dependent) panels. In one strategy, to modify the graphical data represented by an intermediary panel, the user can create a cloned copy of that intermediary panel, thus starting a new leaf panel which can be modified; further, a user can also use a drag-and-drop operation to pull results from any intermediary panel to create a new panel. But in other implementations, this locking behavior with respect to intermediary panels can be relaxed or modified in any way.

Again, in FIGS. 6-14, letters A1 through H2 are assigned to respective exploration panels. FIG. 15 shows a high-level summary view of a subset of these exploration panels, as presented on the exploration canvas 112, namely the exploration panels A1, B2, C3, D1, E2, F2, G2, and H2. Links of different types connect the exploration panels together, including ω-type links (for pivot operations), β-type links (for filtering operations), and one φ-type link (for a cloning operation). The graph exploration module 102 can be configured to allow a user to freely move the exploration panels to desired locations in the exploration canvas 112. Further, the graph exploration module 102 can allow a user to zoom in or zoom out on any part of the exploration canvas 112 and pan within the exploration canvas 112. In addition, the graph exploration module 102 can provide an auto-arrange mechanism which, upon activation, automatically orders the exploration panels based on a selected layout paradigm, such as a fixed-grid ordering paradigm, a grouping paradigm, a graph-drawing algorithm (e.g., using the Sugiyama technique, a force-directed technique, etc.), and so on.

Considered as a whole, the series of exploration panels and links shown in FIG. 15 represents two exploration paths, e.g., where the two paths terminate in different respective leaf node panels ("F2" and "H2," respectively). In this case, the two exploration paths from a branching tree. But any child exploration panel can alternatively draw parts from two or more parent exploration panels. In this case, the exploration paths can form a directed acyclic graph.

The graph exploration module 102 can also incorporate a clean-up mechanism that allows a user to conveniently remove parts of the exploration paths. For example, the exploration module 102 can present a trash interface feature 1502 on the exploration canvas 112 or on another part of the graphical user interface. The user can drag parts of the exploration paths into the trash interface feature 1502 to remove them from the exploration paths. In addition, or alternatively, the clean-up mechanism can include functionality for collapsing part of the exploration paths, such as, for instance, by collapsing a branch within a tree-structured or a DAG-structured collection of exploration paths, etc. The clean-up mechanism can be configured to invoke this operation when the user enters a collapse command, e.g., by double-clicking on a branch, etc. The user can subsequently expand a collapsed part of the collection of exploration paths by entering an expansion command.

In addition, or alternatively, the user can selectively pull data from an individual chart into the trash interface feature 1502. For example, the user could pull one or more bars and/or edges out of a hybrid bar chart, or one or more tags out of a tag chart, or one or more individual entries out of a table chart, and so on. This operation results in the removal of the extracted parts from the graph data that is used to construct the (remaining) chart. For example, in FIG. 9, instead of pulling desired parts out of the exploration panel 704 to create the new exploration panel 904, the user can remove undesired parts from the exploration panel 704 to achieve the same effect.

The history management logic 120 can be used to store and retrieve information regarding the exploration path(s). This enables a user to create an exploration path in a single session or multiple sessions. Further, other people may contribute to the exploration path in a collaborative fashion.

More specifically, in one implementation, the graph exploration module 102 can allow plural users to access the same exploration path(s) presented in an exploration canvas, in offline fashion or simultaneously. The graph exploration module 102 can present a workspace to each user having a viewer-specific visual attribute, such as a distinguishing background color. In one implementation, the graph exploration module 102 can allow each user to read other user's workspaces, but not modify them. Thus, the graph exploration module 102 can allow a user to pull out parts of another user's exploration path or clone parts of the other user's exploration path, but not change the other user's existing exploration path. However, this read-only behavior can be modified in any number of ways based on different collaboration paradigms. In another case, different users may be assigned different types of permissions.

As shown in FIG. 16, a user can select a particular point along an exploration path, such as by moving a cursor pointer 1602 to a particular link or exploration panel in the exploration path. This point corresponds to a particular state of the exploration path. In response, the graph exploration module 102 can selectively highlight the portions of the exploration path which contribute to the identified state. In certain circumstances, one or more bars, edges, and/or tags contribute to the state. If so, the graph exploration module 102 selectively highlights these bars, edges, and/or tags. In other circumstances, an entire exploration panel contributes to the state. In this situation, the graph exploration module 102 highlights the entire panel (as represented in the illustrative and non-limiting case of FIG. 16 by the bold-facing of the borders of certain exploration panels).

Further, the graph exploration module 102 can allow a user to identify any individual node or group of nodes, e.g., by selecting that node (or nodes) in the context of an exploration panel or by selecting that node (or nodes) via a separate search interface (not shown). In response, the graph exploration module 102 can highlight those parts of the exploration path(s) that contain the designated node(s). In some cases, a group of designated nodes may represent a certain portion of an aggregated result shown in a particular chart. The graph exploration module 102 can also incorporate a mechanism for conveying the portion of the aggregated result that is represented by the designated nodes, e.g., by showing a level within a particular bar of a bar chart.

Further, the graph exploration module 102 can allow the user to move the mouse device to select any link in an exploration path. In addition to the above highlighting operations, this action prompts the graph exploration module 102 to display textual information (e.g., in illustrative pop-up bubble 1604) which describes the nature of the transition that is associated with the link.

B. Illustrative Processes

FIGS. 17-21 show procedures that explain one manner of operation of the graph exploration module 102 of Section A. Since the principles underlying the operation of the graph exploration module 102 have already been described in Section A, certain operations will be addressed in summary fashion in this section.

Figure 17:
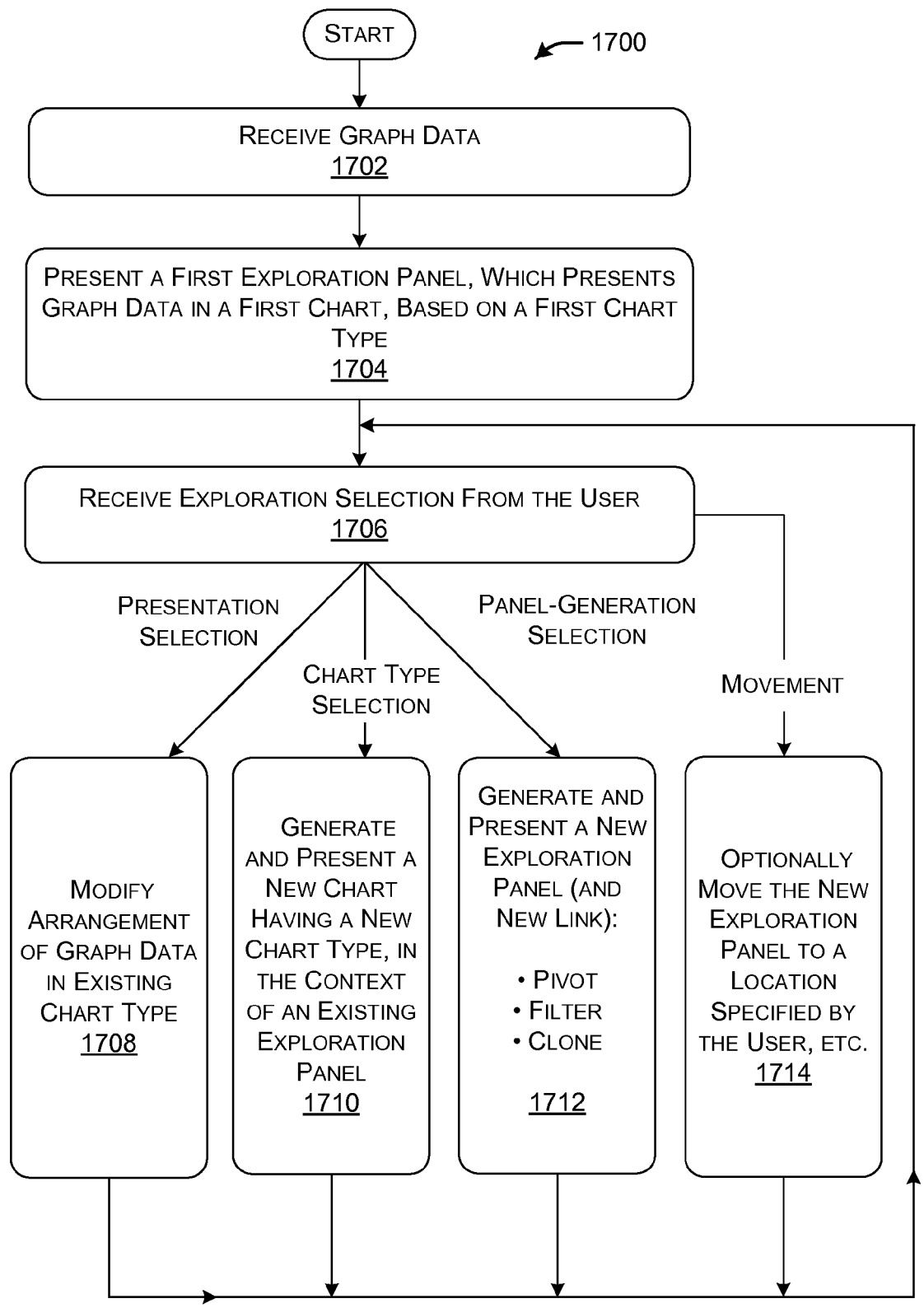
FIG. 17 is a flowchart that presents an overview of one manner of operation of the graph exploration module of FIG. 1.

Starting with FIG. 17, this figure shows a procedure 1700 which represents an overview of one manner of operation of the graph exploration module 102. In block 1702, the graph exploration module 102 receives graph data from any source or combination of sources. In block 1704, the graph exploration module 102 can present an initial ("first") exploration panel. The initial exploration panel presents an initial chart containing a particular node type and default choices for visual attributes (such as the group-by criterion, etc.).

In block 1706, the graph exploration module 1706 receives a selection from a user. The selection may correspond to a presentation selection, a chart-type selection, or a panel-generation selection, a movement selection, etc. In block 1708, if a presentation selection is received, the graph exploration module 102 modifies an arrangement of the graph data in an existing chart in an existing exploration panel. In block 1710, if a chart-type selection is received, the graph exploration module 102 generates and presents a new chart in the context of the existing exploration panel.

In block 1712, if a panel-generation selection is received, the graph exploration module 102 generates and presents a new exploration panel containing a new chart. The graph exploration module 102 also presents a link which connects the new exploration panel to the previous exploration panel.

In block 1714, the graph exploration module 102 optionally allows a user to move any exploration panel that appears on the exploration canvas 112 to a desired location on the exploration canvas 112. The user may also adjust the size of any exploration panel. The user can also perform any other task described in Section A in connection with the exploration canvas 112, such as highlighting parts of an exploration path, deleting parts of an exploration path, collapsing part(s) of a collection of exploration paths, etc.

Figure 18:
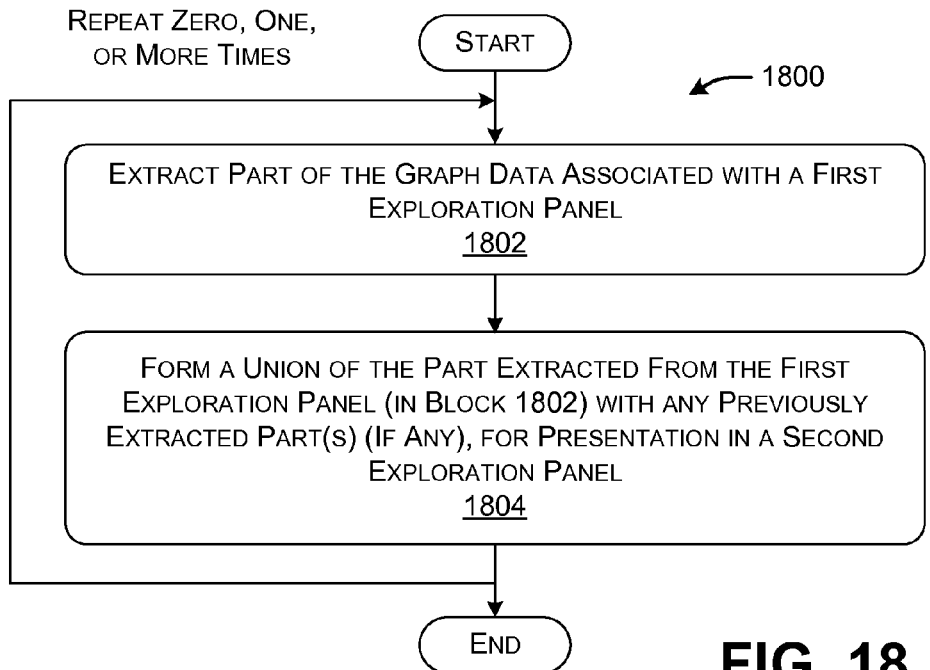
FIG. 18 is a flowchart that describes actions invoked by a filtering-type selection.

FIG. 18 shows a procedure 1800 that describes actions invoked by a filtering-type selection in which one or more parts are extracted from a chart presented in a first exploration panel to generate a second exploration panel. In block 1802, the graph exploration module 102 extracts a part of a chart, e.g., in response to a user's drag-and-drop operation which pulls out a bar or edge of a hybrid bar chart. The first execution of block 1802 produces the second exploration panel. In block 1804, the graph exploration module 102 forms a union of the part extracted in block 1802 with any previously extracted part(s) (if any), for presentation in the second exploration panel. The feedback loop indicates that the user can repeat this extraction operation and union-forming operation any number of times.

Figure 19:
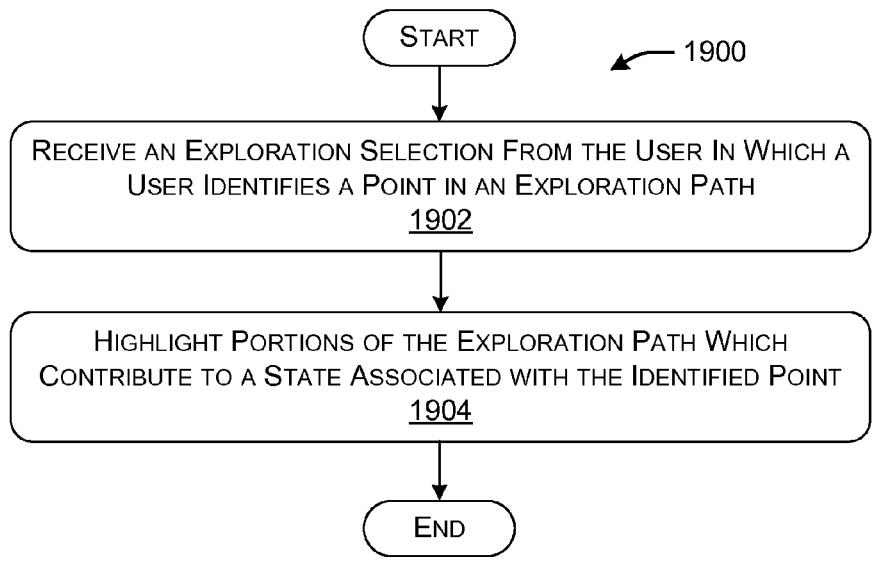
FIG. 19 is a flowchart that describes one manner by which the graph exploration module can highlight portions of an exploration path, e.g., in the manner shown in FIG. 16.

FIG. 19 shows a procedure 1900 for interacting with an exploration path that describes exploration actions made by a user within an exploration session. In block 1902, the graph exploration module 102 receives an exploration selection which identifies a particular point in the exploration path. The point is associated with a state in the exploration path. In block 1904, the graph exploration module 102 highlights a portion of the exploration path which contributes to the identified state. As described in Section A, the graph exploration module 102 can also allow users to select particular node(s), upon which the graph exploration module 102 indicates where those nodes appear within an exploration path.

Figure 20:
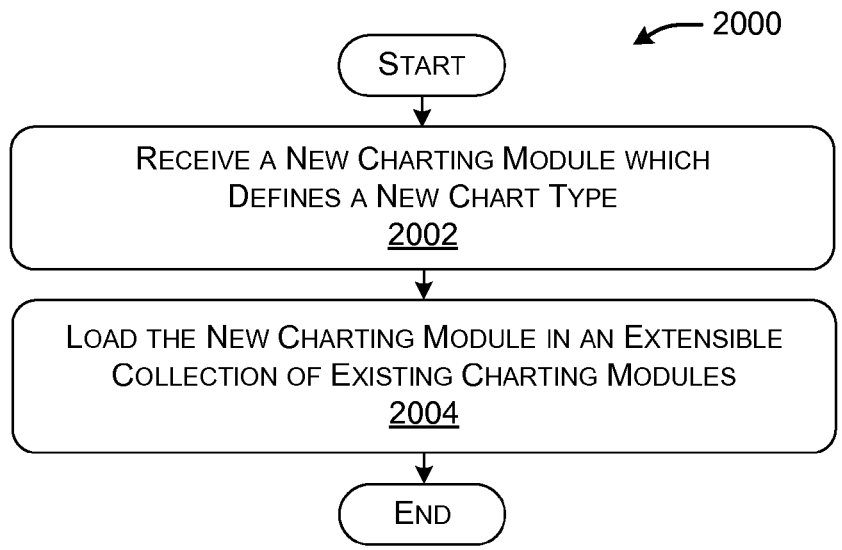
FIG. 20 is a flowchart that describes one manner by which a new charting module can be added to the graph exploration module, where the new charting module provides functionality for producing a new chart type.

FIG. 20 shows a procedure 2000 for adding a new chart type to an extensible collection of existing chart types. In block 2002, the graph exploration module 102 receives a charting module which provides functionality for creating a new type of chart. In block 2004, the graph exploration module 102 loads the new charting module into its collection of existing charting modules.

Figure 21:
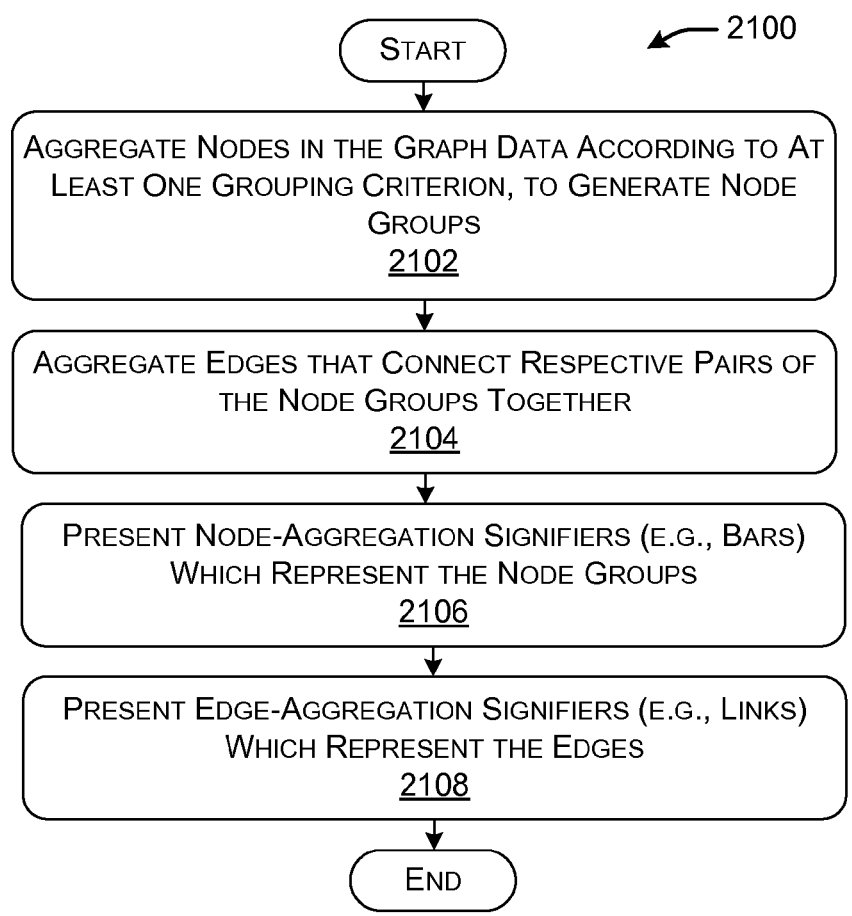
FIG. 21 is a flowchart that describes one manner of producing the hybrid-type bar chart shown in FIG. 5.

FIG. 21 shows a procedure 2100 for producing a hybrid-type bar chart, e.g., as illustrated in FIG. 5. In block 2102, the graph exploration module 102 aggregates nodes in graph data according to at least one grouping criterion, to generate a plurality of node groups. A size-by criterion determines how the sizes of the node groups are represented. In block 2104, the graph exploration module 102 aggregates edges that connect respective pairs of node groups together, to produce a plurality of edge aggregations. Another size-by criterion determines how the sizes of the edge aggregations are represented. In block 2106, the graph exploration module 102 presents node-aggregations signifiers (e.g., bars) that represent the node groups. In block 2108, the graph exploration module 102 presents edge-aggregation signifiers (e.g., links) which represent the edges. The blocks 2106 and 2108 are shown as being performed in series, but can be performed in any order (or at the same time).

In closing, the graph exploration module 102 has been described in the illustrative context of graph data, where graph data represents any data that can be represented by entities (associated with nodes) that are linked together by relationships (represented by edges). But the graph exploration module 102 can also be used for any data set, e.g., comprising a set of entities having attributes associated therewith. The graph exploration module 102 can analyze such a data set for any purpose in any end-user environment, such as in the field of business analytics, etc.

In another application, the graph exploration module 102 can be used to provide a visual mechanism for creating SQL queries or the like. For example, as demonstrated in FIG. 7, the graph exploration module 102 can provide a textual explanation of a combination of filtering operations within the information 710. In one implementation, the graph exploration module 102 can formulate this textual explanation as a formal SQL query. The user can create such an SQL query in the manner described above, e.g., by successively adding filtering conditions using the type of drop-down interface features shown in FIG. 5. At each step in the creation, the current exploration panel provides a visual representation of the effect of the SQL query, e.g., by representing the parts of a database or other resource targeted by the SQL query, etc. The user can also manually edit the SQL query in the manner described above, producing resultant changes in the chart. Or the user can write (or paste in) a completely new SQL query to visualize its effect in one or more exploration panels.

From a broader perspective, the graph exploration module 102 can use such a SQL query-creation tool to create actual SQL queries. For example, a user can create an SQL query in the above-indicated manner and then cut and paste it into a desired application. Alternatively, or in addition, the SQL query-creation tool can be used to train users in the use of SQL.

C. Representative Processing Functionality

FIG. 22 sets forth illustrative electrical data processing functionality 2200 (also referred to herein as computing functionality) that can be used to implement any aspect of the functions described above. For example, the processing functionality 2200 can be used to implement any aspect of the graph exploration module 102 of FIG. 1, e.g., as implemented in the embodiment of FIG. 2, FIG. 3, or in some other embodiment. In one case, the processing functionality 2200 may correspond to any type of computing device that includes one or more processing devices. In all cases, the electrical data processing functionality 2200 represents one or more physical and tangible processing mechanisms.

The processing functionality 2200 can include volatile and non-volatile memory, such as RAM 2202 and ROM 2204, as well as one or more processing devices 2206 (e.g., one or more CPUs, and/or one or more GPUs, etc.). The processing functionality 2200 also optionally includes various media devices 2208, such as a hard disk module, an optical disk module, and so forth. The processing functionality 2200 can perform various operations identified above when the processing device(s) 2206 executes instructions that are maintained by memory (e.g., RAM 2202, ROM 2204, or elsewhere).

More generally, instructions and other information can be stored on any computer readable medium 2210, including, but not limited to, static memory storage devices, magnetic storage devices, optical storage devices, and so on. The term computer readable medium also encompasses plural storage devices. In all cases, the computer readable medium 2210 represents some form of physical and tangible entity.

The processing functionality 2200 also includes an input/output module 2212 for receiving various inputs (via input modules 2214), and for providing various outputs (via output modules). One particular output mechanism may include a presentation module 2216 and an associated graphical user interface (GUI) 2218. The processing functionality 2200 can also include one or more network interfaces 2220 for exchanging data with other devices via one or more communication conduits 2222. One or more communication buses 2224 communicatively couple the above-described components together.

The communication conduit(s) 2222 can be implemented in any manner, e.g., by a local area network, a wide area network (e.g., the Internet), etc., or any combination thereof. The communication conduit(s) 2222 can include any combination of hardwired links, wireless links, routers, gateway functionality, name servers, etc., governed by any protocol or combination of protocols.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by physical and tangible computing functionality, for exploring a data set, the method comprising:

generating and presenting a first exploration panel that presents at least part of the data set using a first chart having a first chart type, the first chart being selected from among a plurality of available chart types, wherein the data set comprises graph data, the graph data including a plurality of nodes and a plurality of edges which connect the plurality of nodes together, the first exploration panel being formulated based on a first subgraph in the graph data comprising a first collection of nodes;

receiving a type selection that identifies another of the plurality of available chart types;

based on the type selection, generating and presenting a second chart having a second chart type, at least one of the plurality of available chart types presenting aggregated results associated with the data set;

receiving a panel-generation selection from a user;

generating and presenting a second exploration panel based on the panel-generation selection, the second exploration panel presenting a second subgraph in the graph data having a second collection of nodes; and presenting a link which connects the first exploration panel to the second exploration panel.

2. The method of claim 1, wherein the plurality of available chart types includes at least one of:
a bar chart type;
a tag cloud type;
a matrix type; and
a table type.

3. The method of claim 1, wherein the panel-generation selection involves a pivoting-type selection of the second subgraph, the first collection of nodes being linked to the second collection of nodes via edges having a specified edge type.

4. The method of claim 1, wherein said generating of the second exploration panel involves extracting a part of the graph data that is presented in the first exploration panel, wherein the part that is extracted is presented in the second exploration panel.

5. The method of claim 4, further comprising performing said extracting two or more times to extract plural parts of the graph data, and forming a union based on the plural parts of the graph data.

6. The method of claim 4, wherein the panel-generation selection is received in response to an action in which the user graphically drags a visual representation of the part from the first exploration panel onto an exploration canvas, to produce the second exploration panel.

7. The method of claim 1, wherein said generating the second exploration panel involves cloning the first exploration panel, to produce the second exploration panel.

8. The method of claim 1, further comprising presenting a logical description of one or more selections which have been made that contribute to generation of the second exploration panel.

9. The method of claim 1, wherein the link that connects the first exploration panel and the second exploration panel has at least one visual attribute which denotes a type of processing action has been performed to produce the second exploration panel.

10. The method of claim 1, further comprising:
receiving an exploration selection from a user which identifies a point in an exploration path, the exploration path including at least two exploration panels, together with one or more links that connect said at least two exploration panels together; and
highlighting portions of the exploration path which contribute to a state that is associated with the point in the exploration path that has been identified.

11. The method of claim 1, further comprising receiving and loading a new charting module which provides functionality for generating a new chart type.

12. The method of claim 1, further comprising:
receiving a presentation selection from a user; and
based on the presentation selection, modifying an arrangement of the data set in the first exploration panel, wherein the presentation selection specifies at least one of:
a criterion for sorting the nodes;
a criterion for sizing respective accumulations of the nodes; and
a criterion for sizing respective accumulations of the edges within the graph data.

13. The method of claim 1, further comprising storing information regarding an exploration path associated with one or more exploration panels, and retrieving the information regarding the exploration path, enabling one or more users to modify the exploration path over two or more sessions.

14. A physical and tangible computer readable medium for storing computer readable instructions, the computer readable instructions performing a method to generate a graphical user interface when executed by one or more processing devices, the method comprising:
generating and presenting a first exploration panel that presents at least part of a data set using a first chart having a first chart type, the first chart being selected from among a plurality of available chart types, wherein the data set comprises graph data, the graph data including a plurality of nodes and a plurality of edges which connect the plurality of nodes together, the first exploration panel being formulated based on a first subgraph in the graph data comprising a first collection of nodes;
receiving a type selection that identifies another of the plurality of available chart types;
based on the type selection, generating and presenting a second chart having a second chart type;
receiving a panel-generation selection from a user;
generating and presenting a second exploration panel based on the panel-generation selection, the second exploration panel presenting a second subgraph in the graph data having a second collection of nodes; and
presenting a link which connects the first exploration panel to the second exploration panel.

15. The computer readable medium of claim 14, wherein the panel-generation selection comprises a pivoting-type selection of the second subgraph.

16. The computer readable medium of claim 14, wherein the panel-generation selection is received in response to an action in which the user graphically drags a visual representation of a part of the graph data that is presented in the first exploration panel onto an exploration canvas, to produce the second exploration panel.

17. The computer readable medium of claim 14, wherein the link that connects the first exploration panel and the second exploration panel has at least one visual attribute which denotes a type of processing action has been performed to produce the second exploration panel.

18. A graph exploration module, implemented by physical and tangible computing functionality, for exploring multimodal, multi-relational and multivariate graph data, the graph exploration module comprising logic configured to:
generate a first exploration panel that represents the graph data in a chart, the chart presenting a plurality of aggregate results based on the graph data, the graph data including a plurality of nodes and a plurality of edges which connect the plurality of nodes together, the first exploration panel being formulated based on a first subgraph in the graph data comprising a first collection of nodes;
receive a panel-generation selection from a user that identifies at least one aggregate result in the chart;
extract the at least one aggregate result to generate a second exploration panel, the second exploration panel representing said at least one aggregate result in another chart; and present a link which connects the first exploration panel to the second exploration panel.

19. The graph exploration module of claim 18, further comprising logic configured to perform the extracting two or more times to extract plural parts of the graph data, and to form a union based on the plural parts of the graph data.

20. The graph exploration module of claim 18, wherein the panel-generation selection is received in response to an action in which the user graphically drags a visual representation of a part of the graph data that is presented in the first exploration panel onto an exploration canvas, to produce the second exploration panel.

* * * * *